Feb. 13, 1968  E. SATHER ET AL  3,368,321
INSERTER
Filed Oct. 30, 1964  17 Sheets-Sheet 1
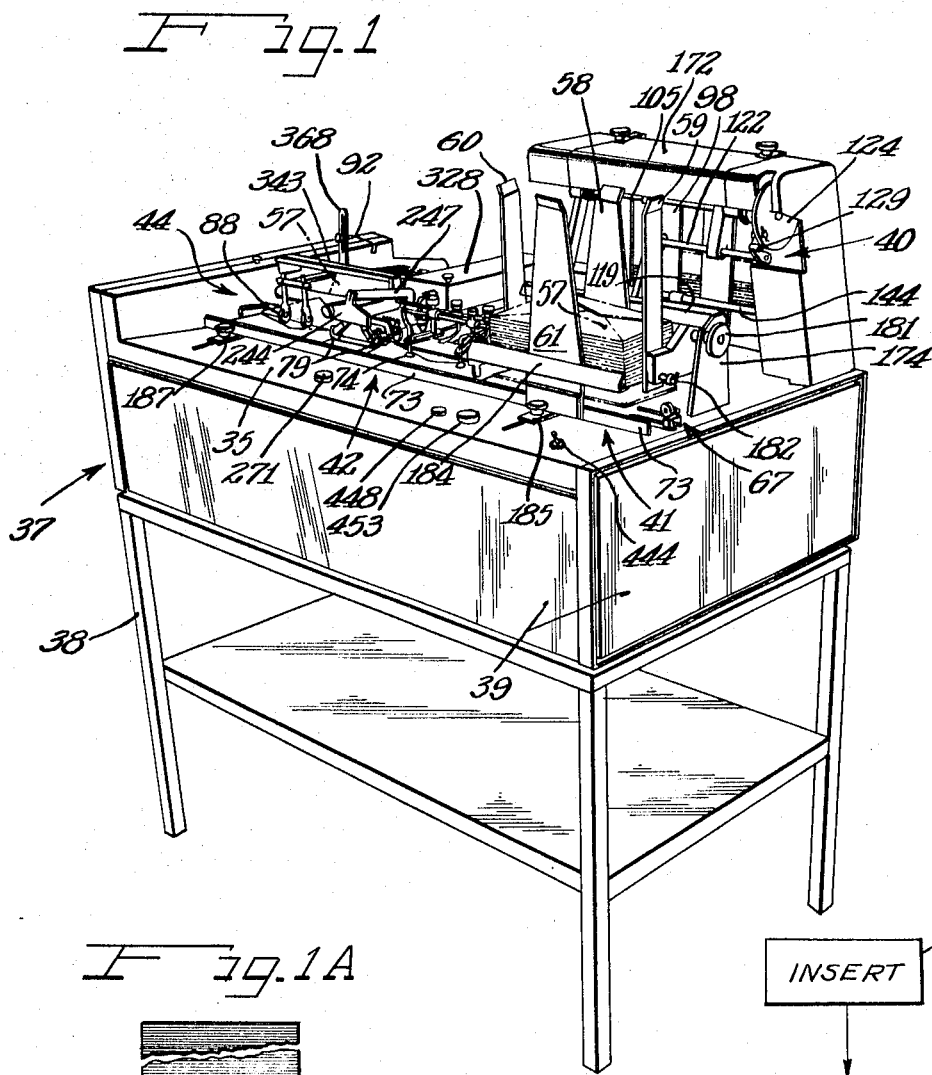
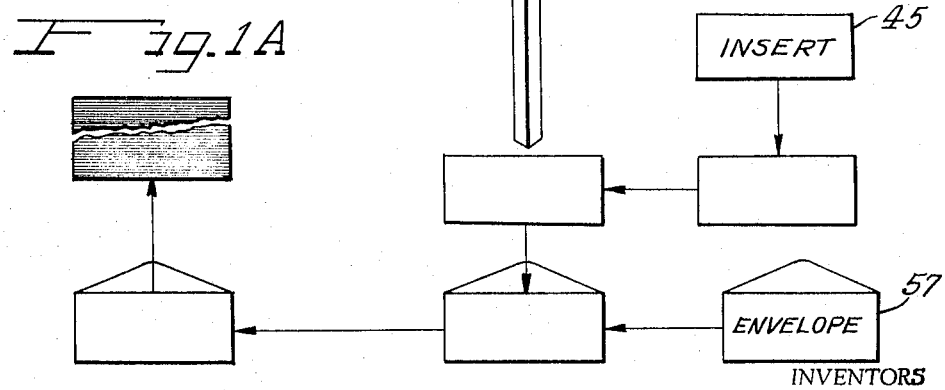
INVENTORS
Eugene Sather
Lester H. Stocker
by
ATTORNEYS

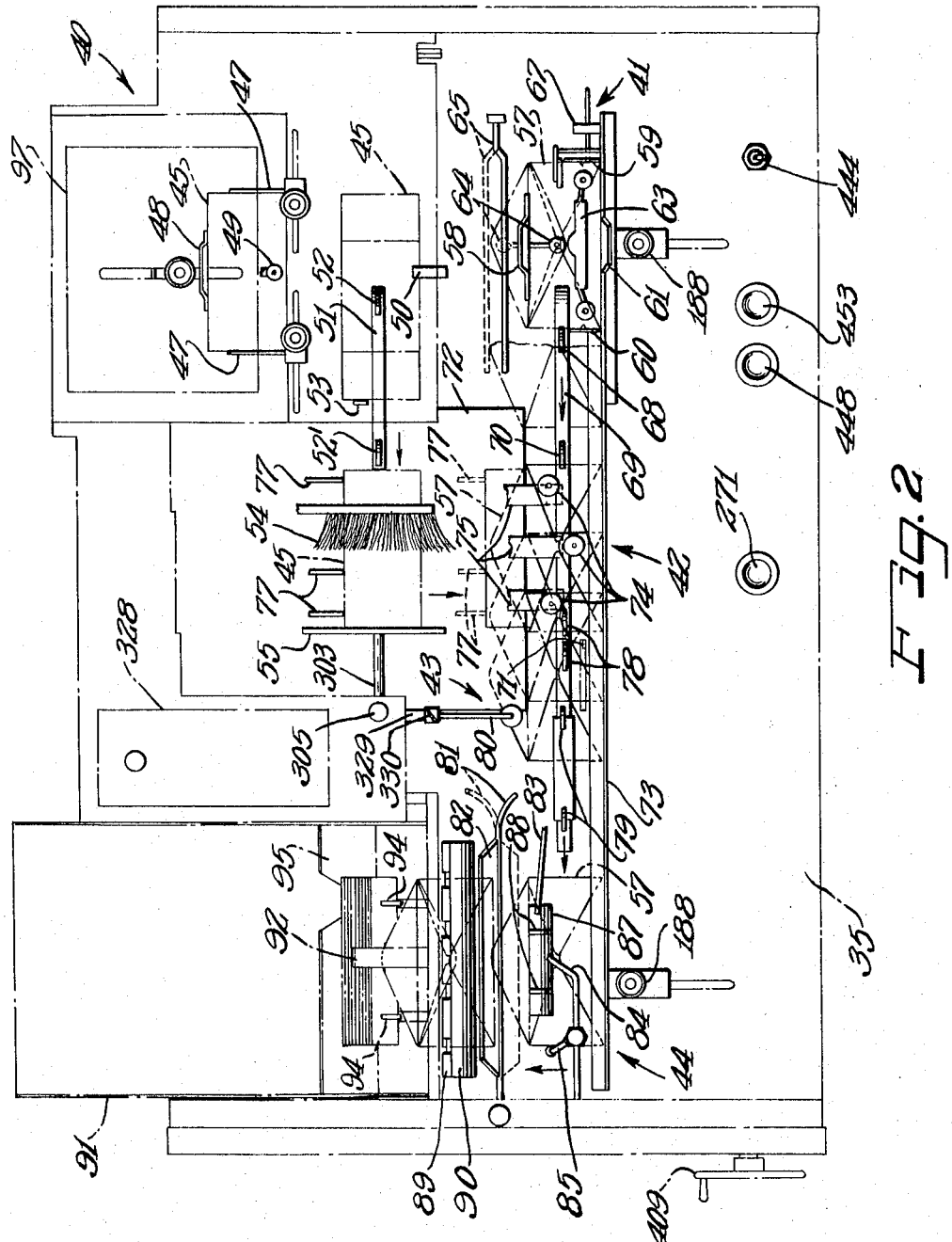

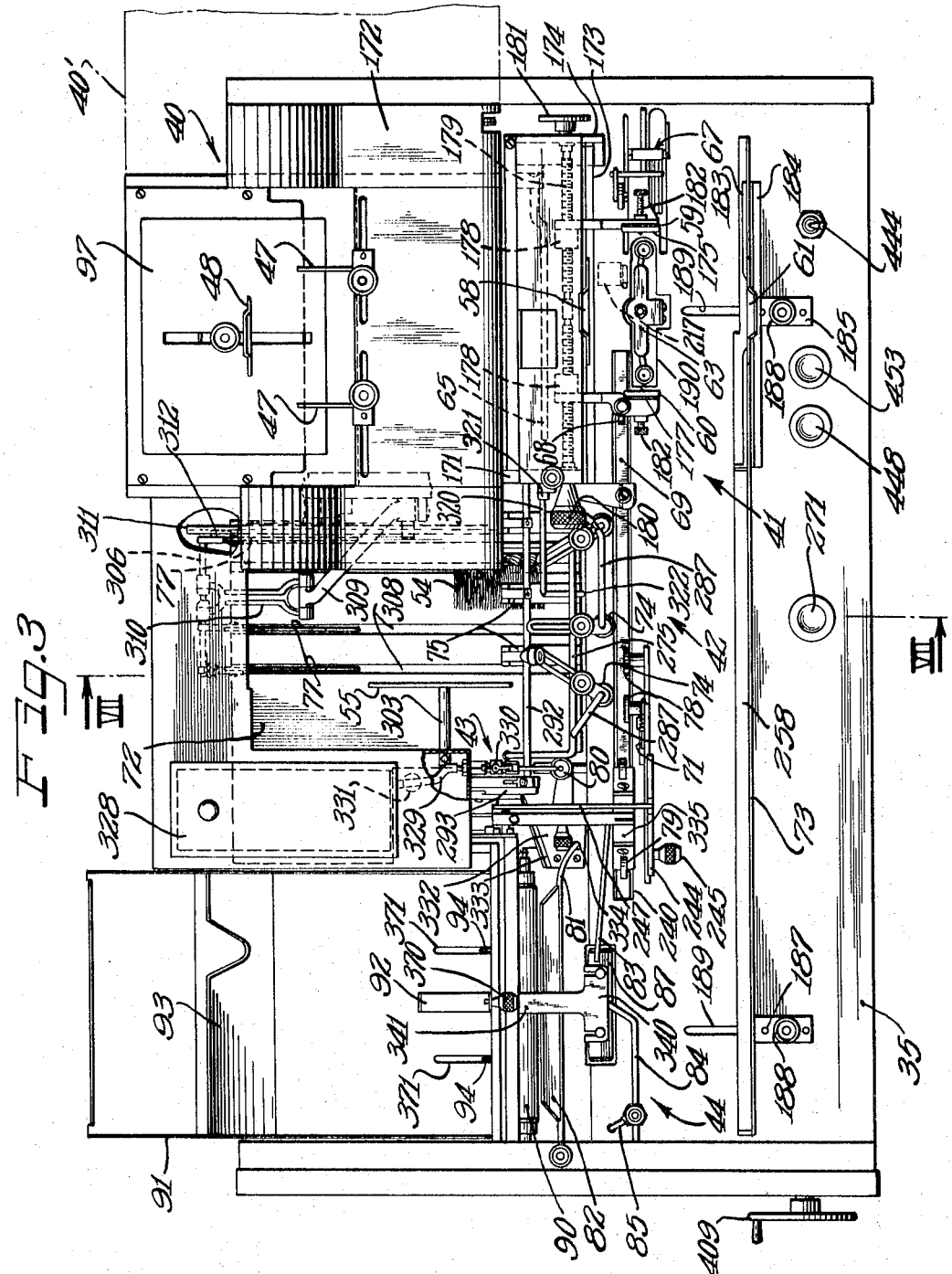

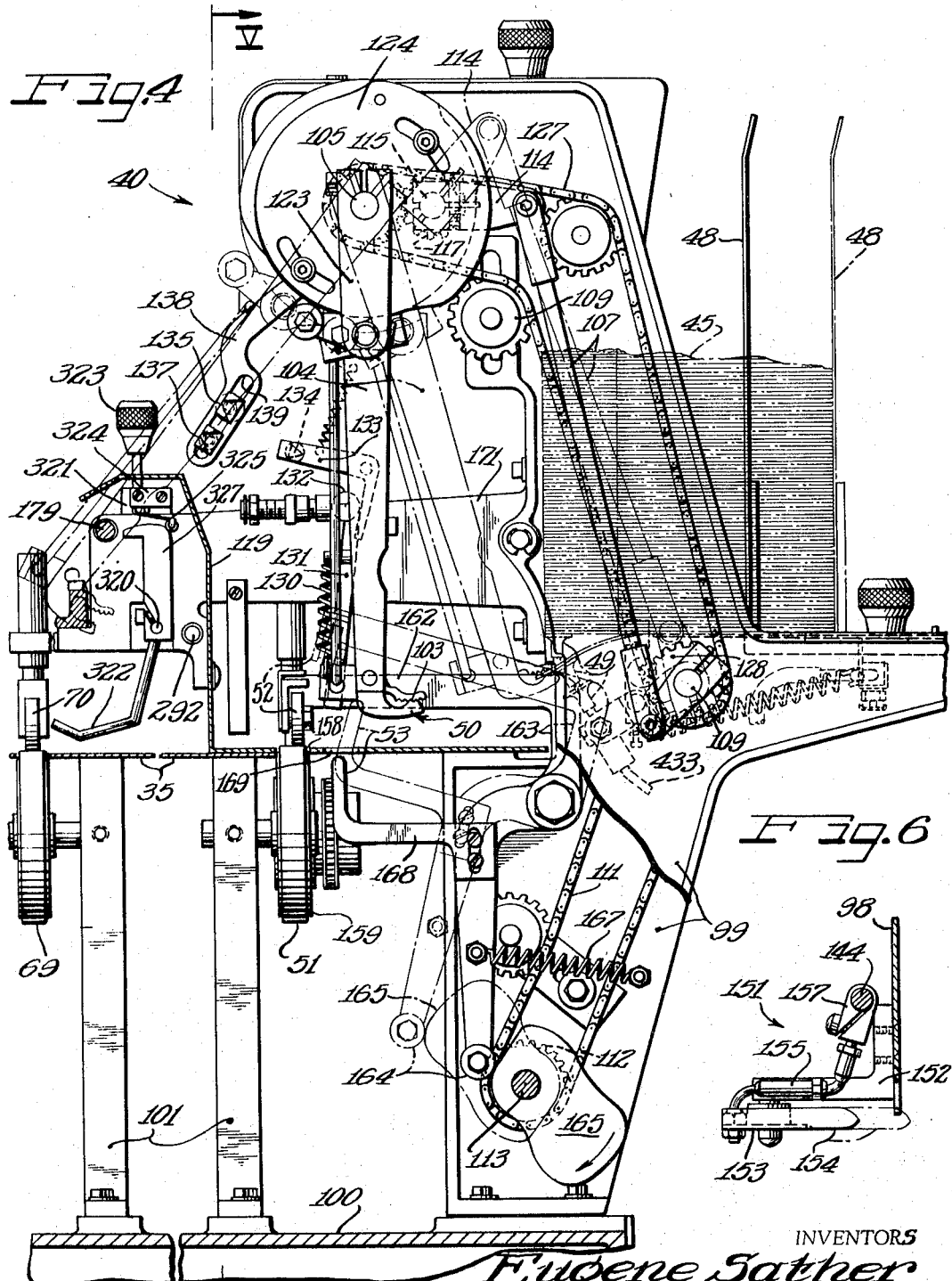

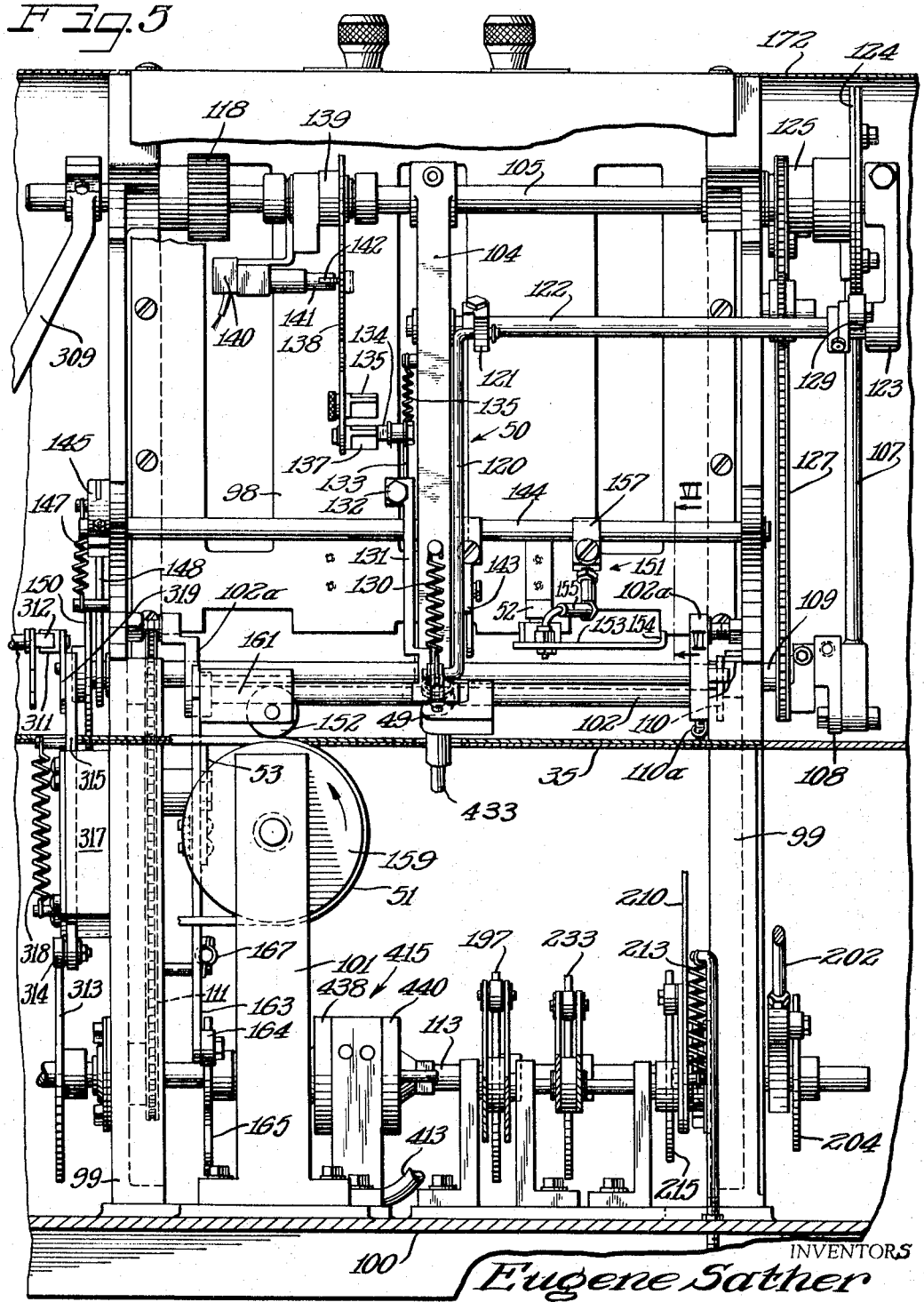

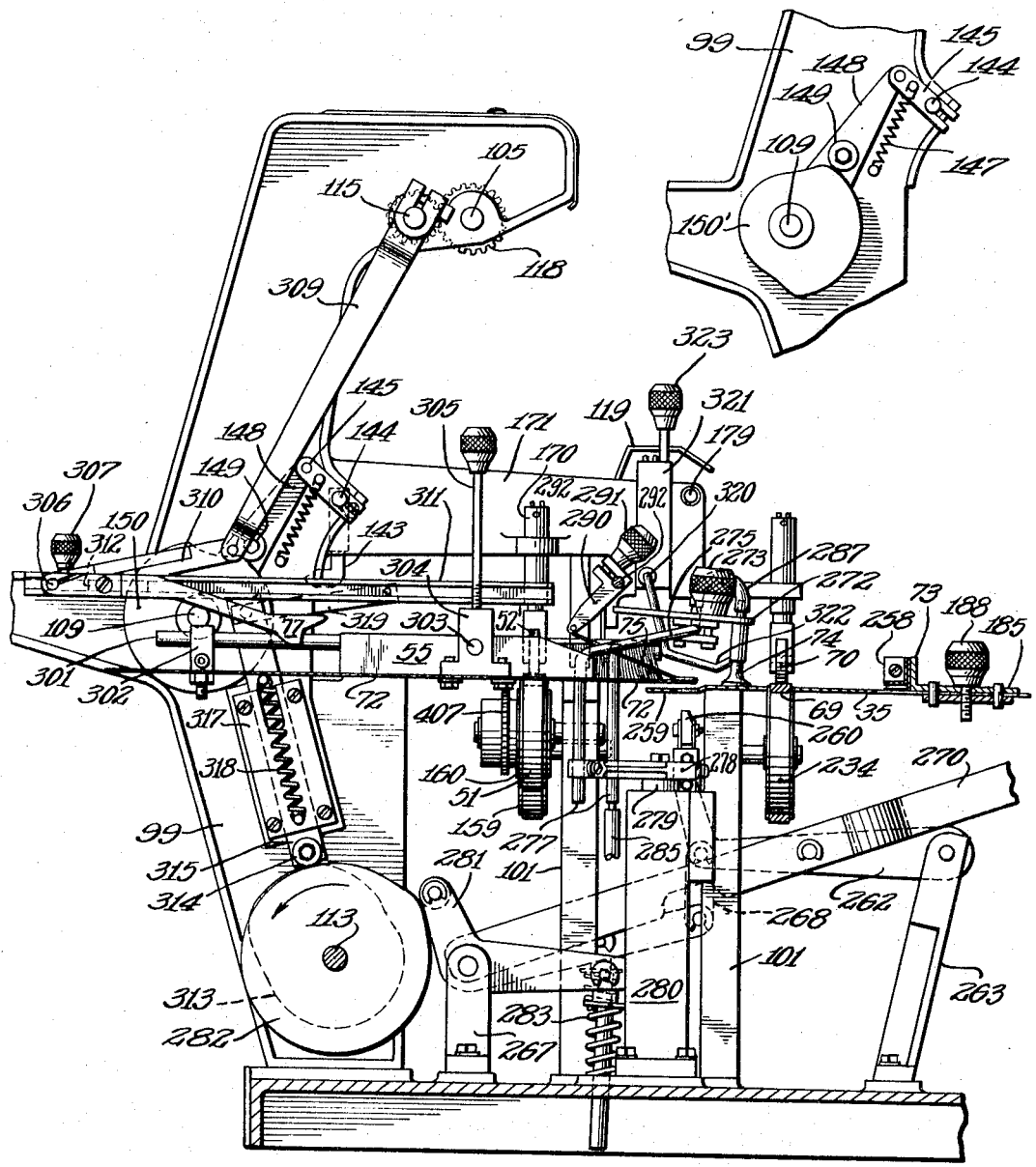

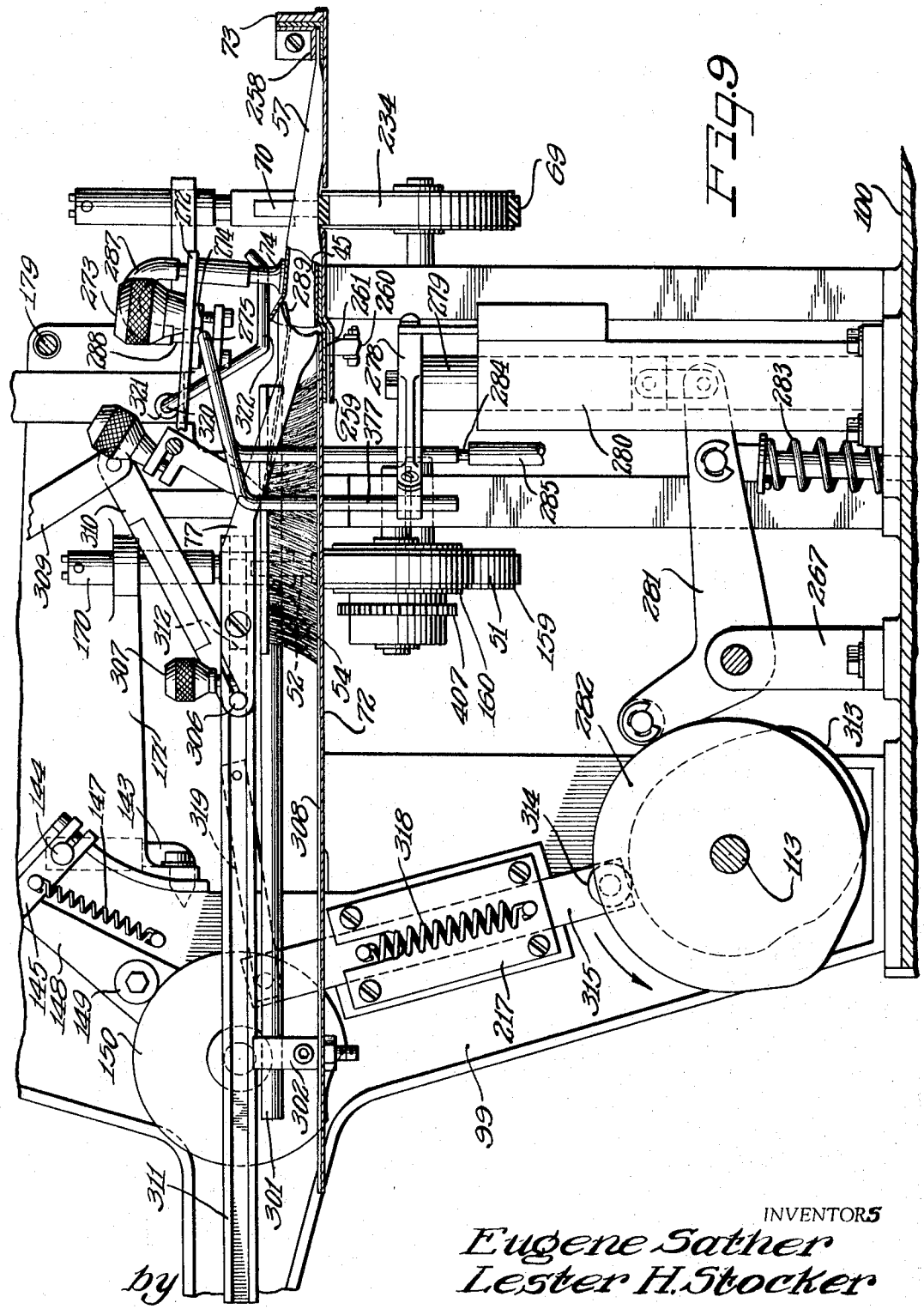

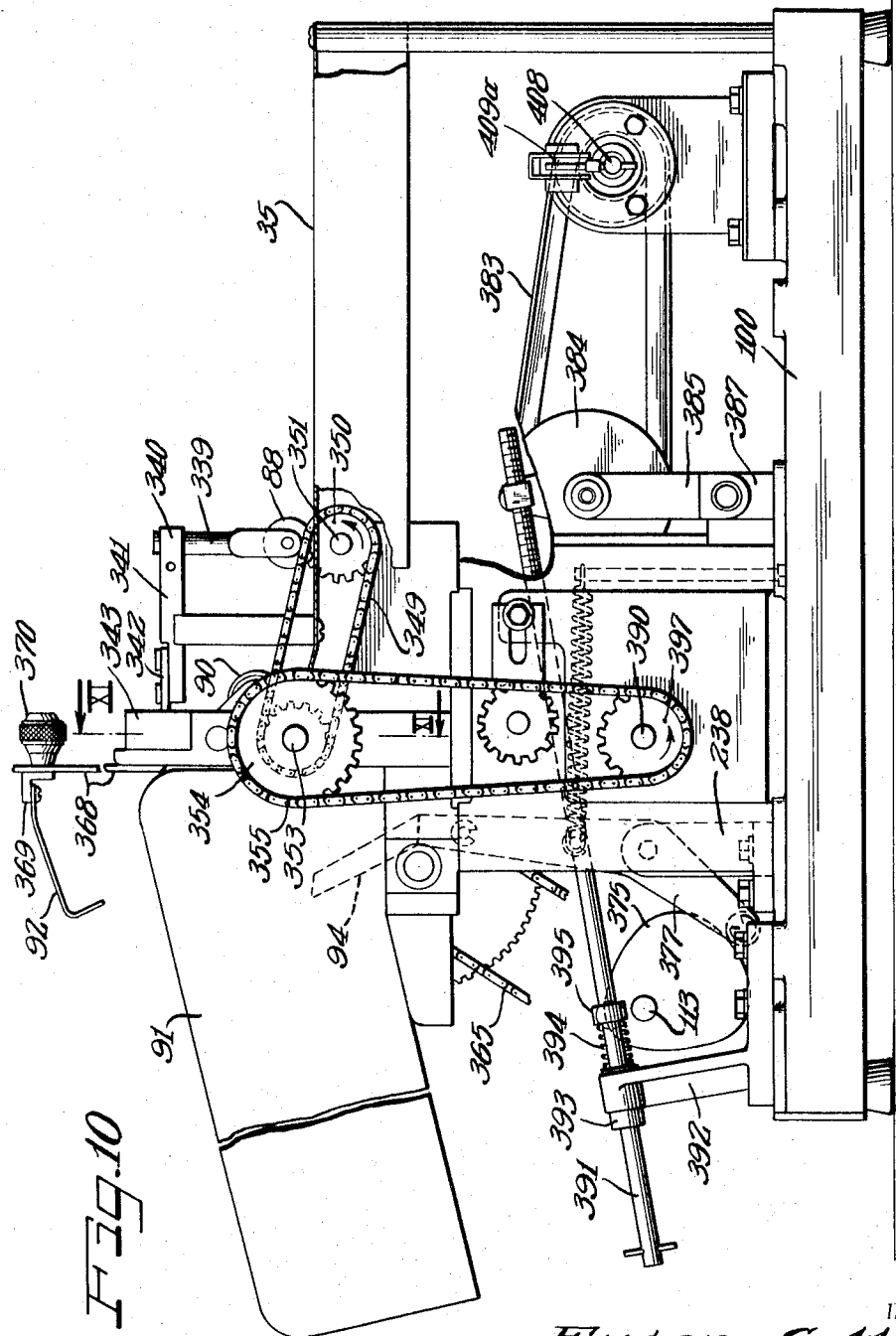

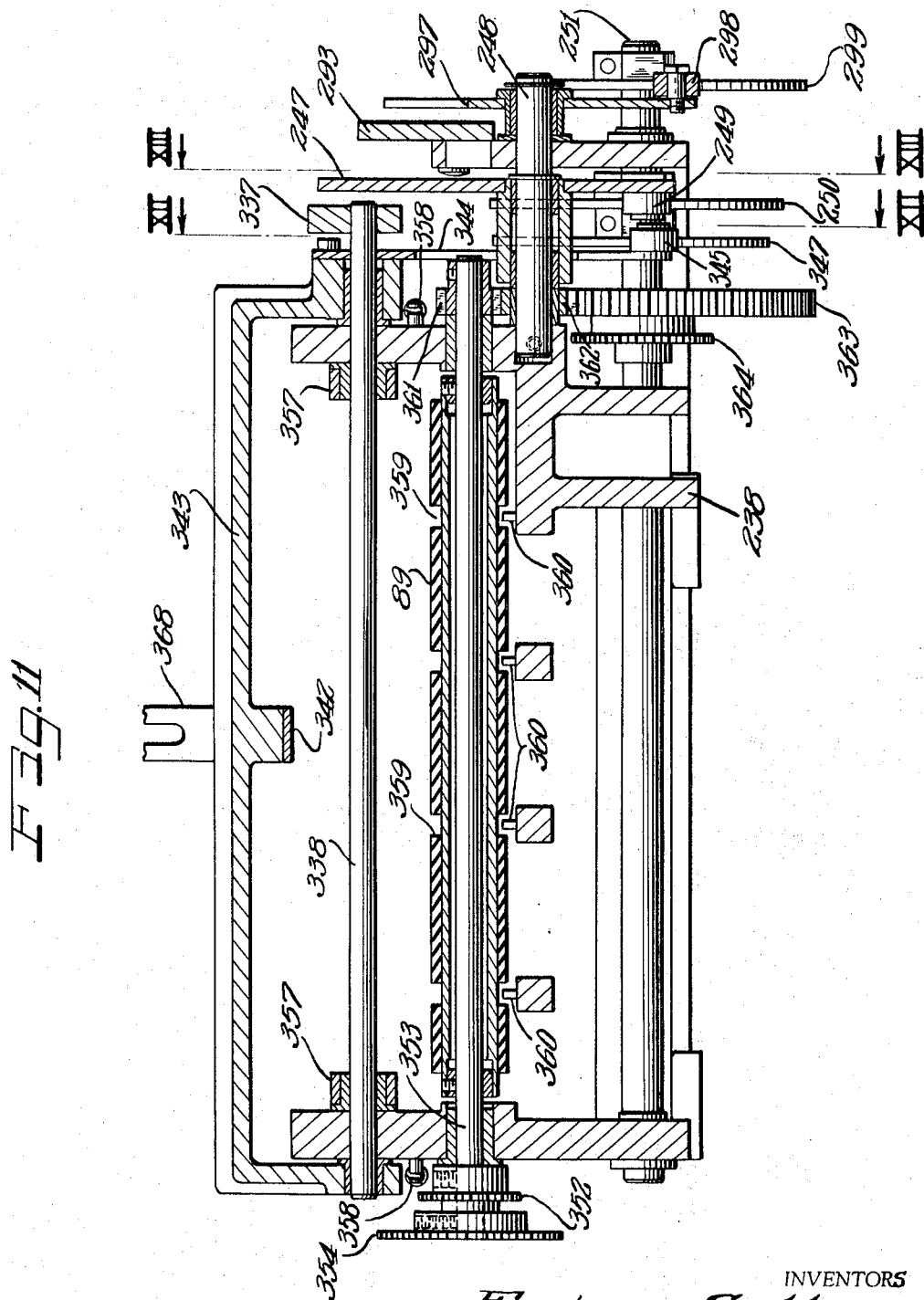

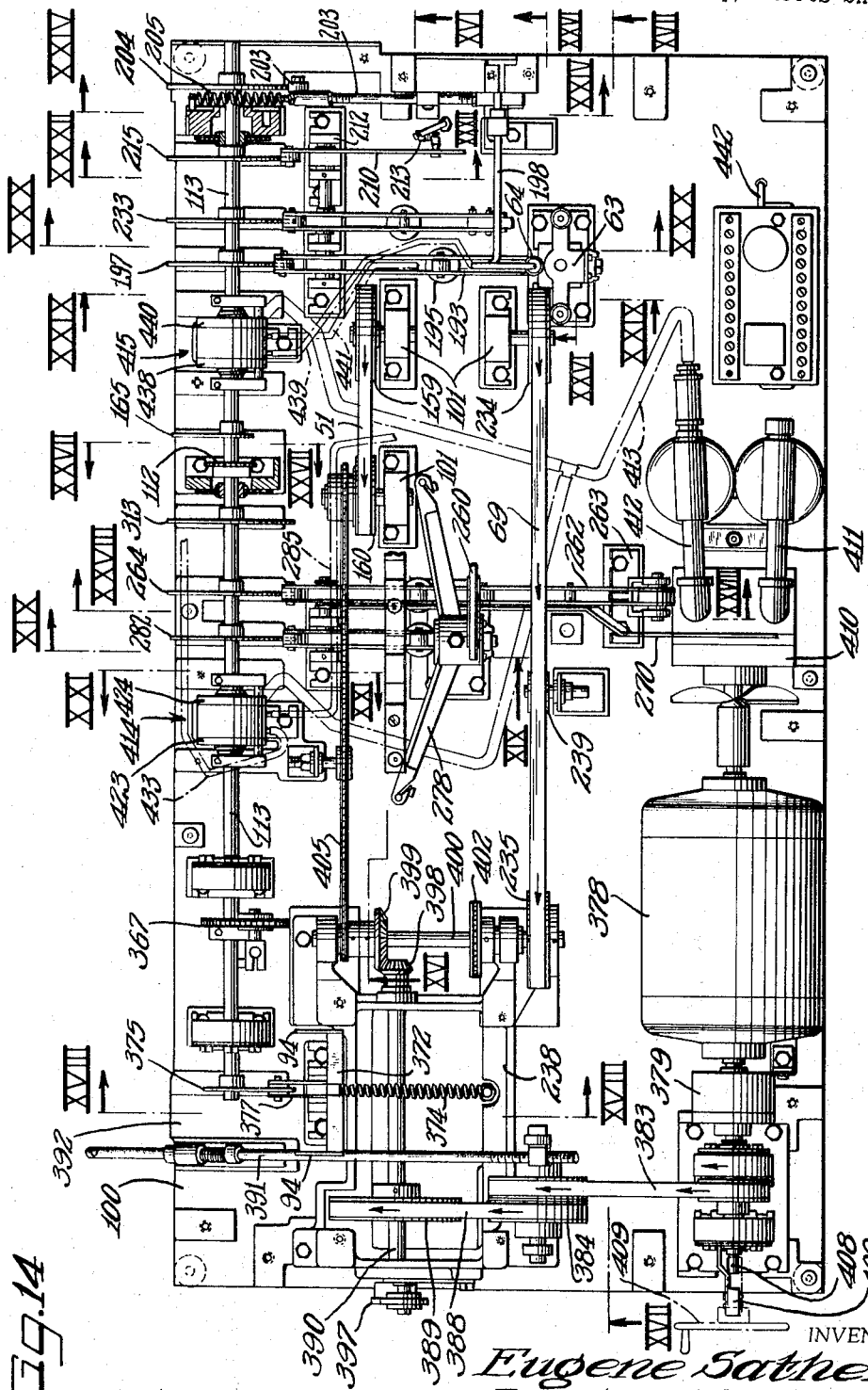

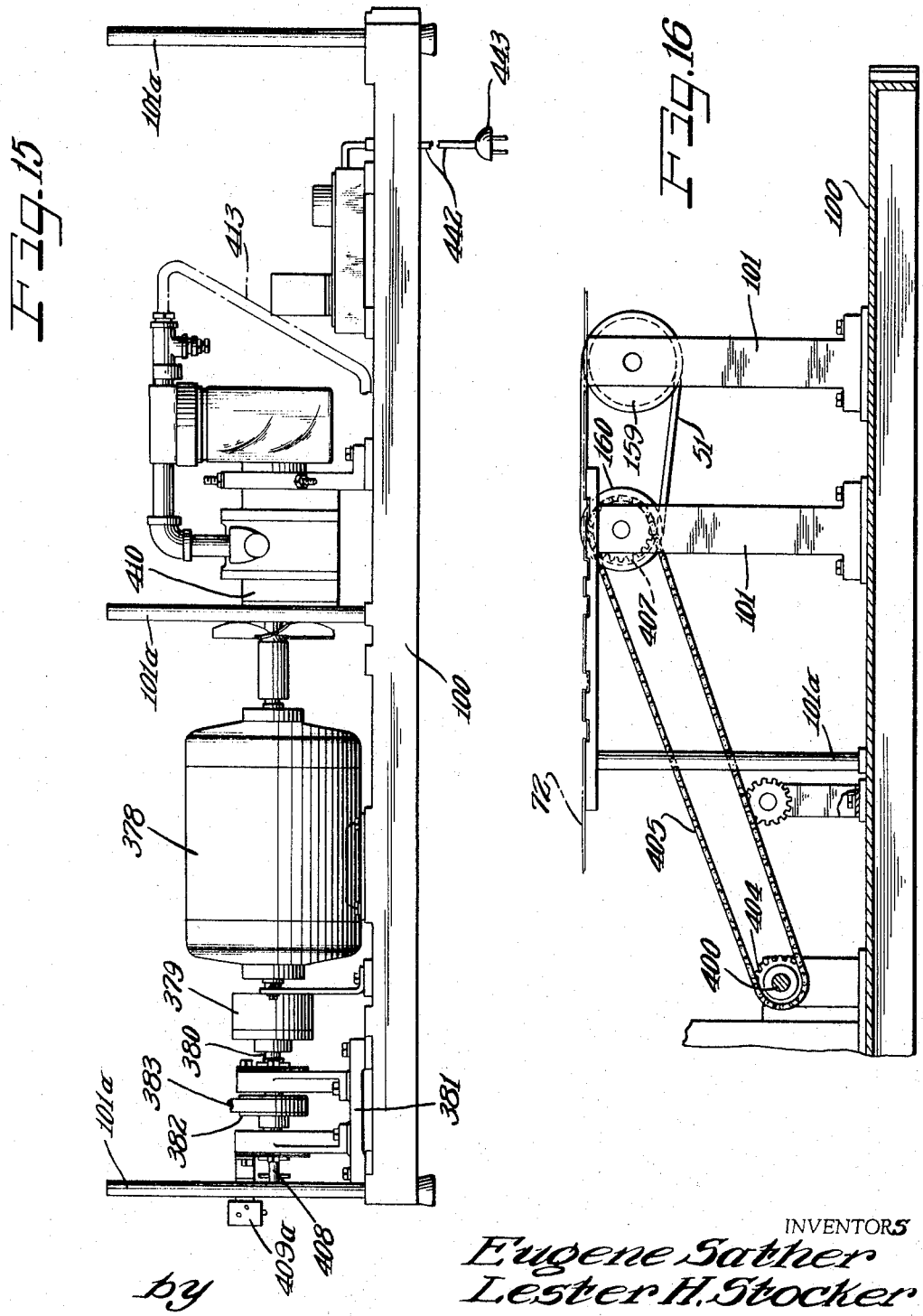

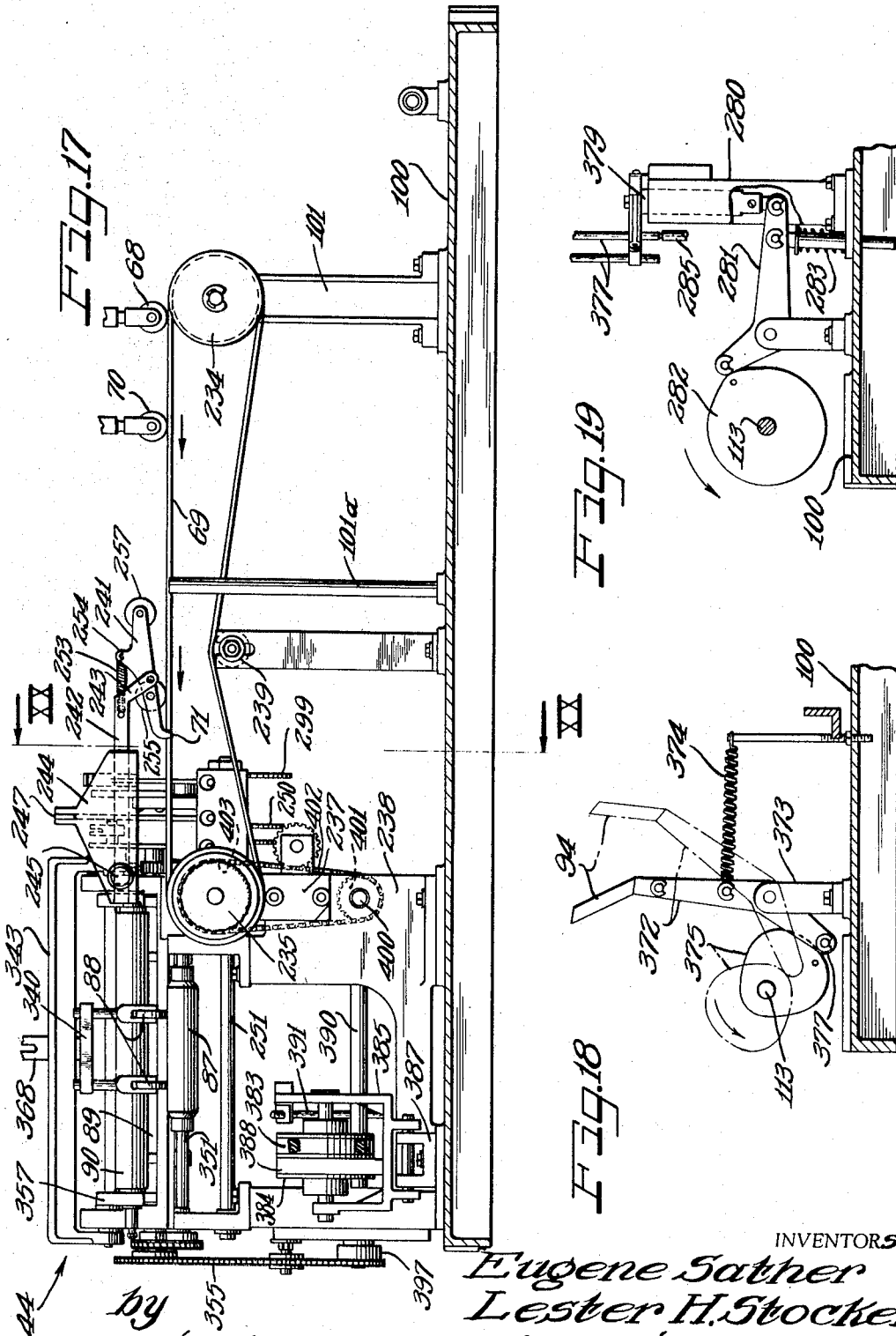

Feb. 13, 1968　　　E. SATHER ETAL　　　3,368,321
INSERTER
Filed Oct. 30, 1964　　　　　　　　17 Sheets-Sheet 14
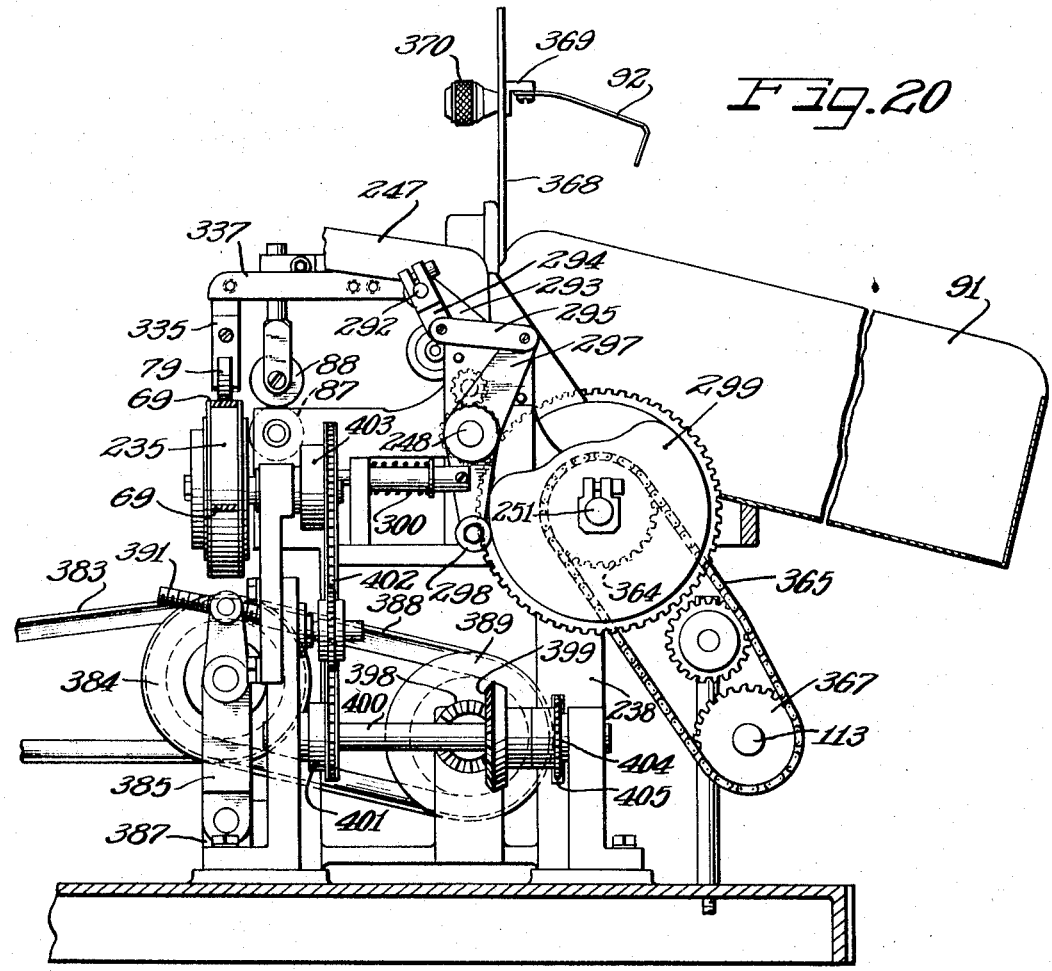
Fig. 20
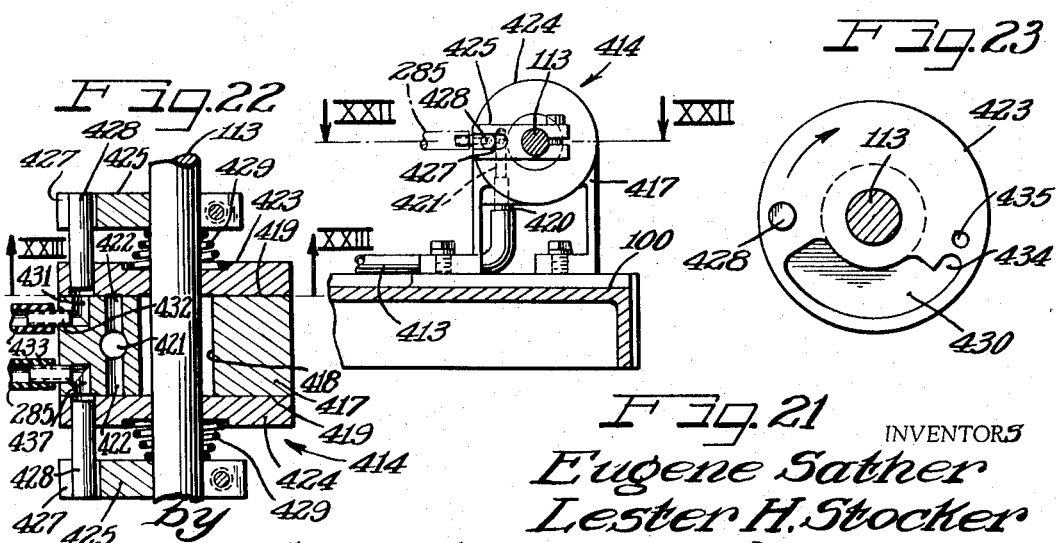
Fig. 22　　Fig. 23
Fig. 21
INVENTORS
Eugene Sather
Lester H. Stocker
ATTORNEYS

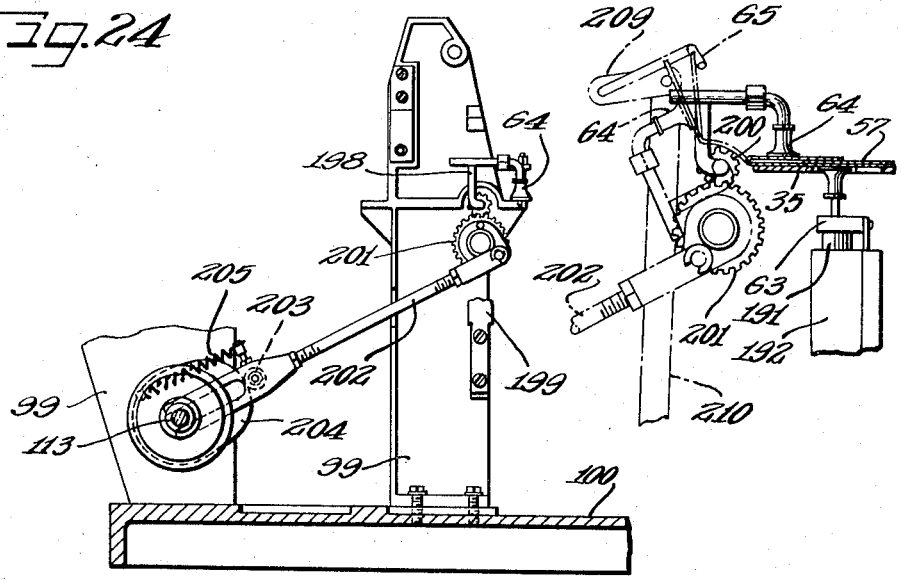
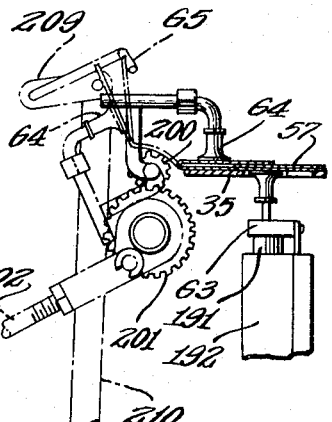
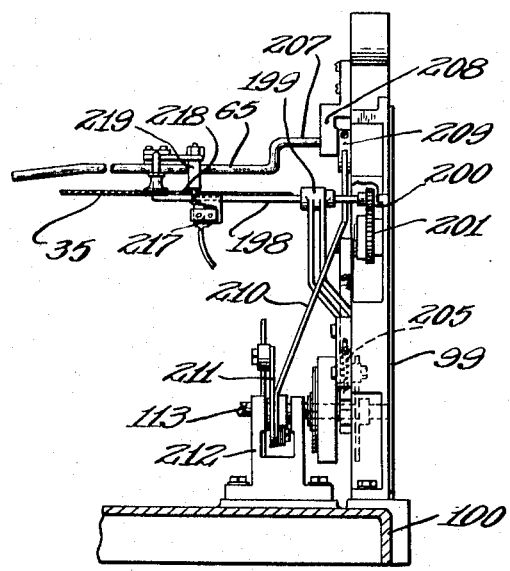
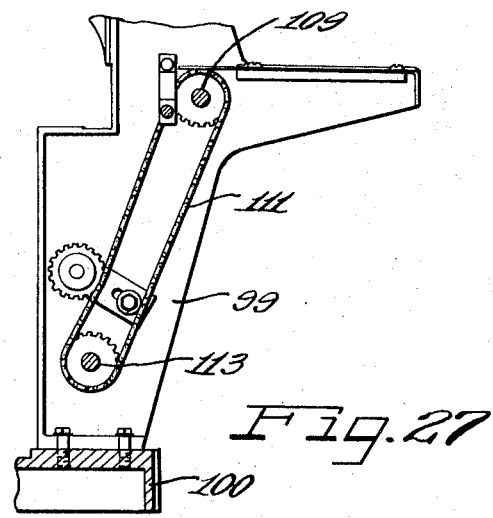

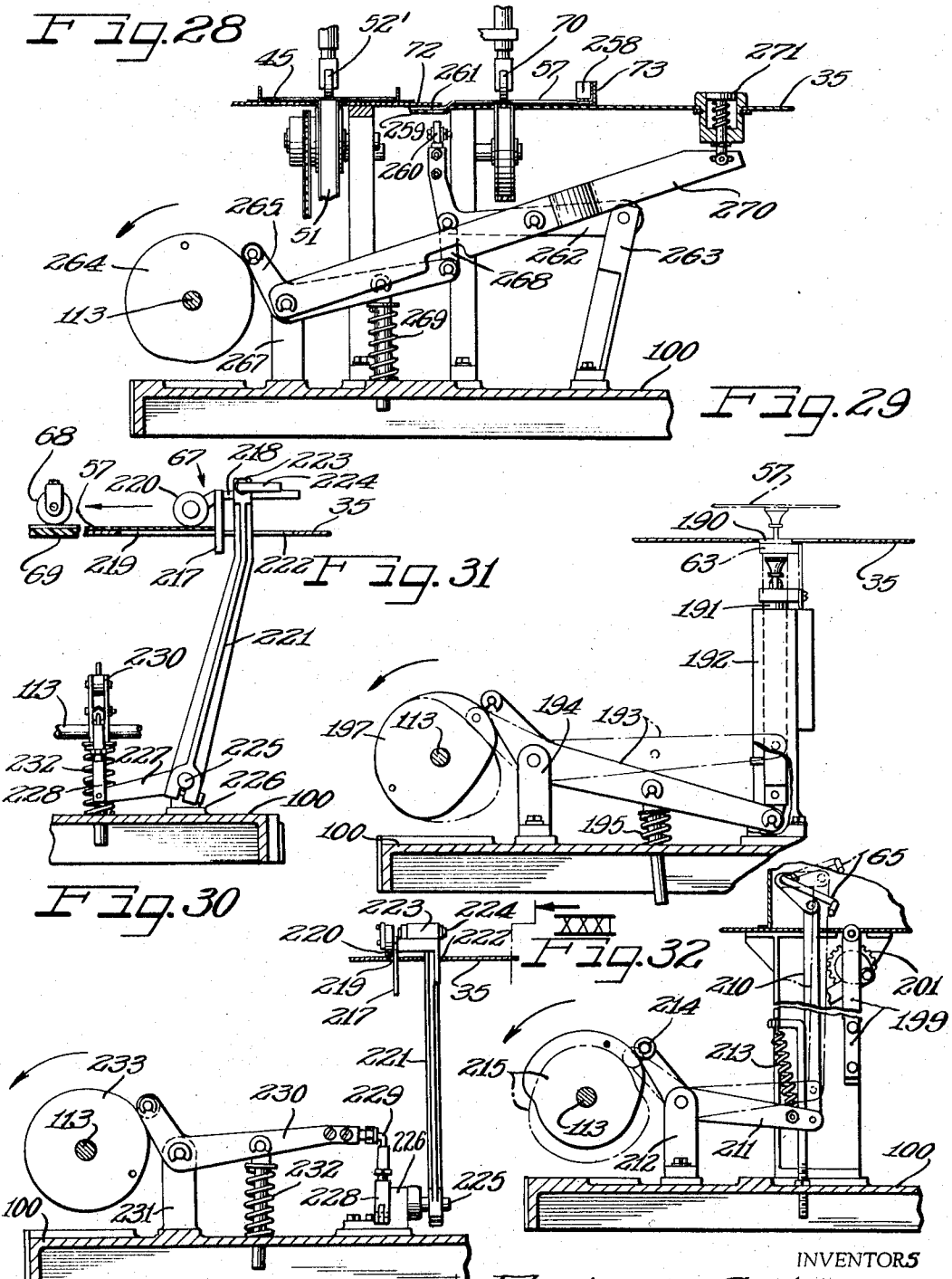

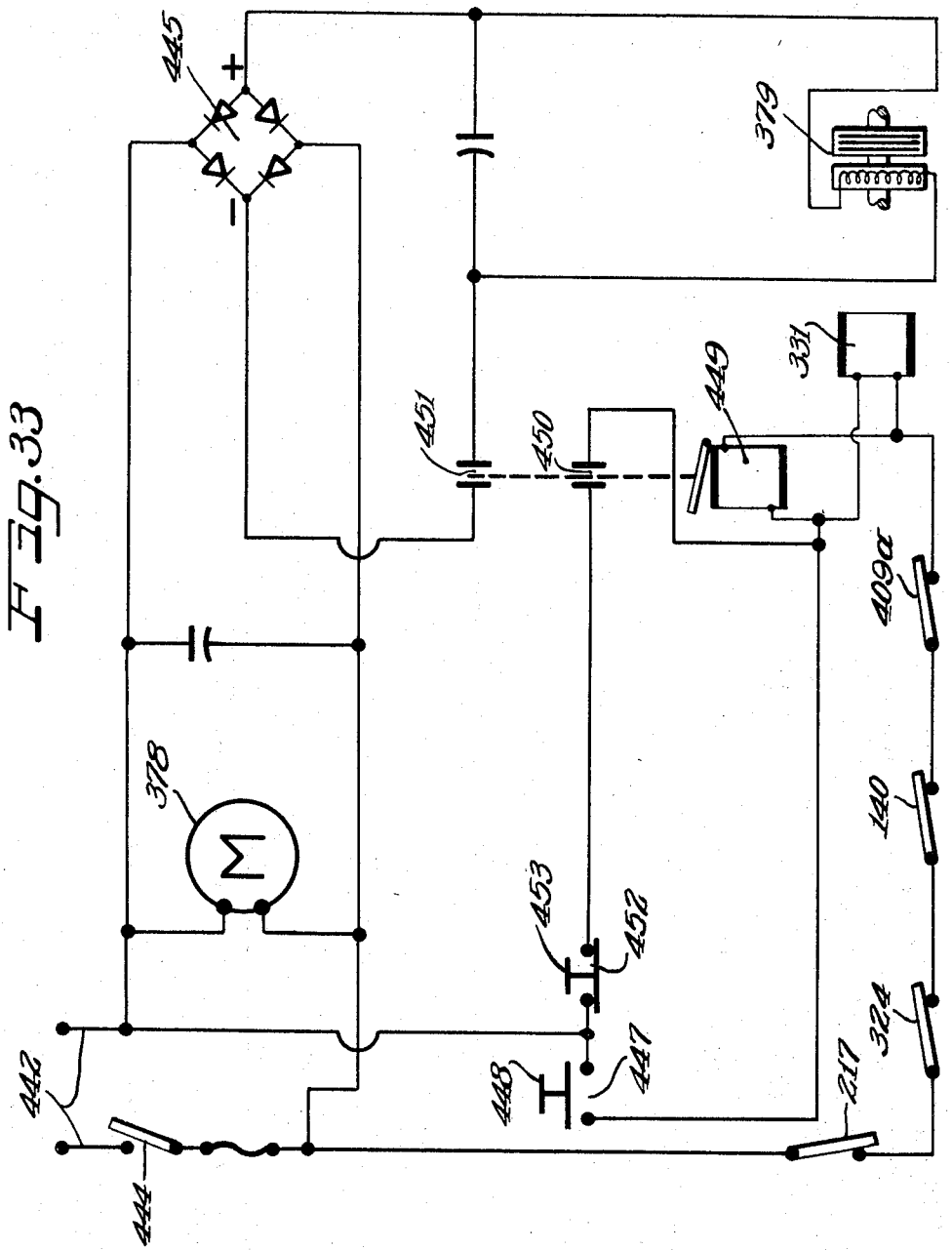

United States Patent Office 3,368,321
Patented Feb. 13, 1968

3,368,321
INSERTER
Eugene Sather, Washington, and Lester H. Stocker, Phillipsburg, N.J., assignors to Bell & Howell Company, Chicago, Ill., a corporation of Illinois
Filed Oct. 30, 1964, Ser. No. 407,715
30 Claims. (Cl. 53—57)

This invention relates to improvements in that class of office machines variously referred to as, simply, inserters, mail inserting machines, envelope handling or stuffing machines, and the like, and which are now extensively used in preparing mass or bulk mailings where the same enclosures are mailed to extensive mailing lists.

Representative of the type of machine with respect to which the present invention affords improvements, is the disclosure in Williams Patent 2,325,455. Machines of the type there disclosed are adapted for collating and inserting groups of substantial number of inserts or mailing pieces in individual envelopes. Such machines, which are in widespread use, are marketed as "Phillipsburg Inserters."

A principal aim of the present invention is to provide an inserting machine operating on the same general principle as in the aforesaid patent, but greatly simplified and more compact in arrangement, especially adapted for use where only one or two inserts or pieces of mail are to be inserted into individual envelopes, and which machine can be sold at a relatively low cost compared to the larger more complex machines.

Another object of the present invention is to provide new and improved insert feeding and conveying means.

A further object of the invention is to provide new and improved envelope feeding and conveying means.

Still another object of the invention is to provide new and improved means for inserting the mailing pieces or inserts into envelopes.

Yet another object of the invention is to provide new and improved stacking means for the filled envelopes.

A yet further object of the invention is to provide new and improved simplified control means for a low cost, compact, simplified inserting machine according to the principles of this invention.

Other objects, features and advantages of the present invention will be readily apparent from the following detailed description of a preferred embodiment thereof taken in conjunction with the accompanying drawings, in which:

FIGURE 1 is a perspective view of a machine embodying features of the invention;

FIGURE 1A is a schematic flow diagram showing the feeding, insertion and stacking steps performed by the machine;

FIGURE 2 is a schematic top plan view of the top working area of the machine;

FIGURE 3 is full top plan view of the machine;

FIGURE 4 is an enlarged fragmental, partially sectional right end elevational view of the machine with casing or housing parts removed;

FIGURE 5 is a fragmentary vertical sectional elevational detail view taken substantially on the line V—V of FIGURE 4;

FIGURE 6 is a fragmentary sectional elevational view taken substantially on the line VI—VI of FIGURE 5;

FIGURE 7 is a fragmentary sectional elevational detail view taken substantially on the line VII—VII of FIGURE 3;

FIGURE 8 is a fragmentary elevational detail view depicting a modified cam adapted to replace a similar cam in FIGURE 7;

FIGURE 9 is an enlarged fragmentary sectional elevational view similar to FIGURE 7 and showing various operating parts in different relative positions in an envelope filling cycle;

FIGURE 10 is a fragmental end elevational view taken taken from the right side of the machine, with various casing or housing parts omitted;

FIGURE 11 is an enlarged fragmentary sectional detail view taken substantially on the line XI—XI of FIGURE 10;

FIGURE 14 is a top plan view, partially in section of the base assembly of the machine;

FIGURE 15 is a front elevational view of the base assembly of the machine;

FIGURE 16 is a fragmentary sectional elevational view taken substantially on the line XVI—XVI of FIGURE 14;

FIGURES 17 is a sectional elevational detail view taken substantially on the line XVIII—XVIII of FIGURE 14;

FIGURE 18 is a fragmentary sectional elevational detail view taken substantially on the line XVIII—XVIII of FIGURE 14;

FIGURE 19 is a fragmentary sectional elevational detail view taken substantially on the line XIX—XIX of FIGURE 14;

FIGURE 20 is a fragmental sectional elevational detail view taken substantially on the line XX—XX of FIGURE 17;

FIGURE 21 is a fragmentary sectional elevational detail view taken substantially on the line XXI—XXI of FIGURE 14;

FIGURE 22 is an enlarged sectional detail view taken substantially on the line XXII—XXII of FIGURE 21;

FIGURE 23 is a sectional elevational view taken substantially on the line XXIII—XXIII of FIGURE 22;

FIGURE 24 is a fragmentary sectional elevational detail view taken substantially on the line XXIV—XXIV of FIGURE 14;

FIGURE 25 is a fragmentary sectional elevational detail view showing the relationship of the envelope withdrawing and envelope flap opening means of the envelope feed mechanism;

FIGURE 26 is a fragmentary sectional elevational detail view taken substantially on the line XXVI—XXVI of FIGURE 14;

FIGURE 27 is a fragmentary sectional elevational detail view taken substantially on the line XXVII—XXVII of FIGURE 14;

FIGURE 28 is a fragmentary sectional elevational detail view taken substantially on the line XXVIII—XXVIII of FIGURE 14;

FIGURE 29 is a fragmentary sectional elevational detail view taken substantially on the line XXIX—XXIX of FIGURE 14;

FIGURE 30 is a sectional elevational detail view taken substantially on the line XXX—XXX of FIGURE 14;

FIGURE 31 is a sectional elevational detail view taken substantially on the line XXXI—XXXI of FIGURE 30;

FIGURE 32 is a fragmental sectional elevational detail view taken substantially on the line XXXII—XXXII of FIGURE 14; and FIGURE 33 is an electrical diagram of the operating control system of the machine.

Machine in general

Figure 12:
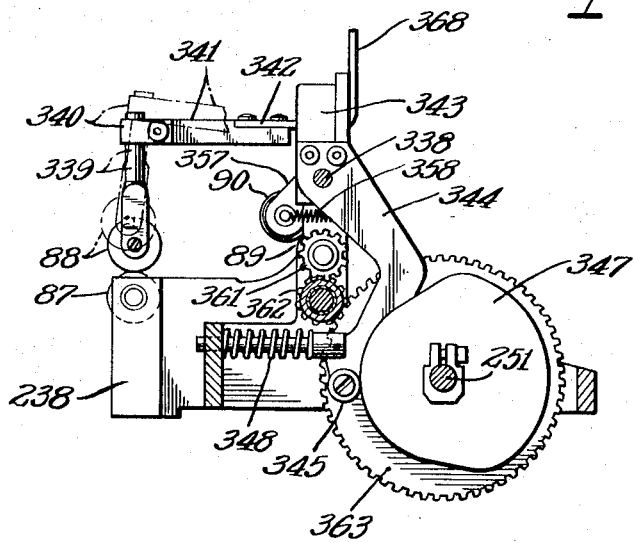
FIGURE 12 is a fragmentary sectional elevational detail view taken substantially on the line XII—XII of FIGURE 11.
Figure 13:
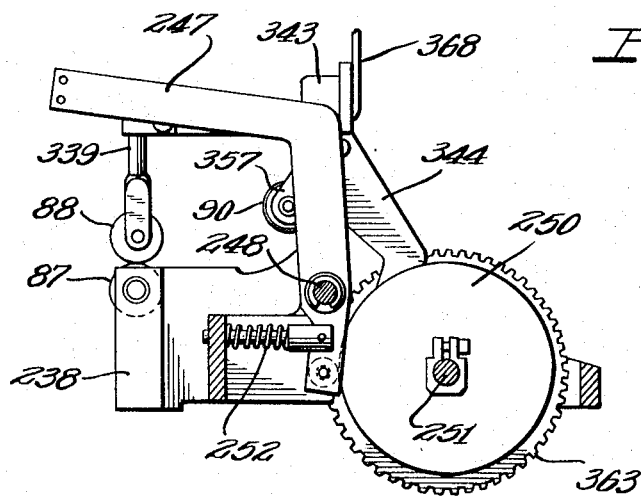
FIGURE 13 is a fragmentary sectional elevational detail view taken substantially on the line XIII—XIII of FIGURE 11.

On reference to FIGURE 1, the machine includes a working table 35 supported over a base 37 adapted to be mounted on a table or stand 38. Suitable removable front, back and side housing panels 39 enclose the base.

Within the compact area of the generally rectangular table 35 is provided an arrangement wherein successive inserts and corresponding successive envelopes are deposited in parallel paths on the table, transported to an assembly point, the assembled insert and envelope then shifted to a discharge point and stacked, accompanied by sealing of the envelope flap where desired. For this purpose, the table 35 is elongated from side-to-side and has thereon adjacent to its right side, in the representative example of the machine shown, a rear insert station 40 (FIGS. 1, 2 and 3), in front of which is an envelope supply magazine station 41. Generally, centrally on the table 35 and aligned with the insert and envelope stations is an envelope filling station 42, immediately to the left of which is an envelope flap moistener assembly 43. On the left-hand end portion of the table 35 is a filled envelope stacker 44. While a single insert station has been shown, the machine is readily adapted for the addition of a second insert station 40' (FIG. 3) onto or alongside the insert station 40 to provide a two insert station machine, by simple extension of the insert station mechanism.

In the schematic illustration of FIGURE 2, a flow pattern depicting the sequence of occurrences or steps in automatic operation of the machine is provided for ready understanding. In the area of the insert station 40, inserts 45 are supported in a stack within an adjustable magazine or hopper adapted to accommodate inserts within a range of sizes. While inserts of any size are supported with their front edges in the vertical stack on a predetermined line, respective opposite upstanding laterally adjustable side hopper plates 47 are provided and an upstanding front-to-rear adjustable hopper plate 48 is provided. Within the insert hopper the stack is supported with the lowermost insert at a suitable elevation above the table 35, whereby a deflecting pneumatic sucker 49 is operable to deflect the forward marginal portion of the lowermost insert downwardly in timed relation to operation of means comprising a gripper 50 which withdraws the lower insert and deposits it on a conveyor belt 51 and under a raising and lowering press-down roller 52 for transportation under a second press-down roller 52' and to the inserting station 42. In order to maintain a desirable feeding alignment of the insert 45 with envelope feed, a stop 53 synchronized with the roller 52 is initially interposed in the path of movement of the insert to engage with its leading edge. As the insert is transported into the inserting station 42, it passes under a hold-down brush 54 having elongated flexible bristles extending generally in the direction of movement of the insert and assuring flat horizontal lying of the insert on the table area to engagement of the leading edge of the insert with an adjustable stop 55 by which the insert is halted for inserting.

Feeding of successive envelopes 57 from a vertical stack in the envelope station 41 is synchronized with feeding of the successive inserts 45. In the stack, the envelopes are disposed with their flaps on the upper side and the flap edges of the envelopes directed rearwardly. A fixed upright rear hopper plate 58 properly orients the flap edges of the stacked envelopes. A right side upstanding adjustable hopper plate 59 and a left side upstanding adjustable hopper plate 60 cooperate with the fixed hopper plate 58 and an adjustable upstanding front hopper plate 61 to confine and support the stack of selected size envelopes in proper orientation over a pull-down pneumatic sucker assembly 63 which functions in time with the insert feeding mechanism to pull the successive lowermost envelopes 57 downwardly onto the table 35. As each envelope is deposited on the table, an oscillating pneumatic flap opening sucker assembly 64 functions to open the flap and an oscillating eccentric flap hold-down bar 65 moves from a clearance position as shown in dash outline to the full outline flap hold-down position. Thereupon, a reciprocating envelope pusher assembly 67 thrusts against the trailing or right-hand edge of the envelope and pushes it in a path toward the inserting station 42. As the envelope is advanced by the pusher 67, it moves under a first press down roller 68 which may be carried by or associated with the left-hand hopper plate 60 and coacts with a conveyor or transport belt 69 to advance the envelope to a second hold-down roller 70 over the conveyor belt 69 and by which the envelope is caused to move into inserting alignment with the insert 45 to receive thereby, the advancing edge of the envelope being halted by a stop 71. As the envelope advances from the transport roller 68 to the transport roller 70, its opened flap advances from the hold-down bar 65 under a hold-down plate 72 comprising a part of the inserting station 42. Rectilinear advance of the envelope is assured by a longitudinal guide bar or rail 73 comprising an extension of the front envelope magazine or hopper plate 61 and adjustable therewith, and along which the closed longitudinal bottom edge of the envelope rides throughout its travel from the envelope station 41 to the stacker station 44.

With the concurrently fed insert 45 and envelope 57 aligned in the inserting station 42, the envelope is opened by means comprising a set of pneumatic suckers 74 which grip its upper side adjacent its open edge, and a set of insert guiding fingers 75 enter the open mouth of the envelope. Coordinated with the envelope opening suckers and the guide fingers, a set of pusher fingers 77 act to engage the rear edge of the insert 45 and drive it forwardly into the open envelope.

Immediately upon full insertion of the insert 45 in the envelope 57, the filled envelope is released and the stop 71 retracted and a set of press down rollers 78 adjacent to the stop function with th conveyor belt 69 to advance the envelope toward press down rollers 79 which continue advancing the envelope to the stacker station 44. If the envelopes are to be sealed, the gum or mucilage on the envelope flaps is moistened by moistener assembly 80 as the flaps leave the left side of the hold-down plate 72.

As the envelope 57 enters the stacker station, the open envelope flap, if it is to be closed engages deflecting means, conveniently comprising a curved deflecting finger 81 extending downwardly into engagement with the table 35 from a guide bar 82 longitudinally overlying the table and functioning to move the envelope flap upwardly toward its closing position as the envelope is advanced under hold-down guide bars or fingers 83 and 84 to an adjustable end stop 85. As the envelope is halted by engagement of its leading or left edge with the stop 85, it is in stacker feeding position between an underlying take away propelling roller 87 and overlying cooperative press-down rollers 88 which then function to feed the envelope rearwardly under the flap closing bar 82 and into the nip of stacker rollers 89 and 90 serving not only to press the moistened flap closingly against the back of the envelope but also to discharge the closed envelope into a rearwardly extending stack receptacle 91. To avoid overshooting of the envelope, overhead deflecting means comprising a deflecting arm or finger 92 extends rearwardly beyond the stacker rollers. Means comprising reciprocable kicker fingers 94 thrust the successively fed envelopes into stacked position toward a back-up plate 95.

Should it be desired to stack the envelopes with their flaps open, the flap moistener 80 is disconnected, and the envelope flap deflector bar 82 is readjusted into the dash line position thereof in FIGURE 2 wherein the envelope camming or deflector finger 81 is directed upwardly and rearwardly and the bar 82 is located to project downwardly and forwardly instead of upwardly and rearwardly. Hence, as the envelopes are fed into the stacker station 44, the open flaps thereof are held open and as the takeout rollers 87 and 88 move the envelope rearwardly, the flap enters point first between the stacker rollers 89 and 90 and the envelope is delivered into the receiving tray or receptacle 91 with the flap remaining open.

Insert station

Support for the stack of inserts 45 in the insert supply station 40 is provided by a bottom plate structure 97 having its front edge in suitably spaced gap relation to a fixed upright front magazine or hopper plate 98 (FIG. 5). Both of such structures are carried by suitable upright frame structure 99 mounted on the rear portion of a base plate 100 which is suitably spaced below the panel or plate structures providing the table 35 partially supported on the frame structure 99 and additionally supported at suitable intervals by means including frame posts or risers 101 and 101a mounted on the base 100 (FIGS. 4 and 15).

Mounting of the insert deflecting sucker 49 is on a bar 102 supported on hangers 102a pivoted on the frame 99 adjacent the exit from the insert hopper and operating in timed relation with the gripper 50 for presenting the front margin of the lowermost insert 45 for engagement by gripping jaws 103 of the gripper in the sequence depicted in FIGURE 4.

As shown, the gripper 50 is of the oscillating or swinging arm type including a fixed jaw arm 104 attached to a rock shaft 105 carried by an upper overhanging portion of the frame 99. Cyclical oscillations of the rock shaft 105 and thereby of the gripper arm 104 are effected by means including a pitman link 107 pivotally attached to a crank 108 fixed to a shaft 109 mounted on the frame 99 adjacent to the sucker bar 102. This shaft 109 carries a sucker cam 110 and is continuously rotatably driven by means of a sprocket chain 111 trained over a driving sprocket 112 on a driven rotary cam shaft 113 suitably mounted longitudinally on and across the rear of the base 100. Reciprocating motion of the pitman link 107 are translated into oscillating motion by a rocker link or arm 114 pivoted on the upper end of the pitman and fixed on a transmission rocker shaft 115 having a gear 117 which meshes with a gear 118 (FIG. 5) fixed on the gripper arm rock shaft 105. Each rotary cycle of the shaft 109 effects one complete rocking cycle of the gripper arm and also a timed cycle of the insert feed sucker 49 through the cam 110 acting against the bias of a return spring 110a.

In timed sequence, the movable member of the gripper jaws 103 is opened on the inward swing of the arm 104 to receive the margin of the insert to be withdrawn between the jaws, is clamped onto such insert margin, remains closed until the insert is fully withdrawn and approaches an upright stripper plate structure 119 suitably spaced from the hopper magazine, and is opened to release the insert. Such cycling of the movable jaw is effected through a cycling link 120 attached thereto and to an arm 121 rigid with a rock shaft 122 having its adjacent end portion journalled in the arm 104 and its opposite end portion journalled in a supporting bracket 123 fixedly attached to the outer end of the rock shaft 105. Timed oscillations of the jaw actuating rock shaft 122 are effected by an adjustable, two plate disk cam 124 freely rotatable on the rock shaft 105 between the bracket 123 and the adjacent side portion of the machine frame 99. Rigid with the hub of the cam 124 is a sprocket 125 over which is trained a flexible drive member such as a sprocket chain 127 running over a sprocket gear 128 fixed on the rotary shaft 109, whereby the disk cam 124 is continuously rotated with the shaft 109. Engaging the camming perimeter of the disk assembly 124 is a crank follower 129 rigid on the rock shaft 122 and held against the cam perimeter by the bias of a tension spring 130 anchored at one end to the gripper arm 104 and at its opposite end to the movable gripper jaw and normally acting to close the gripper jaw.

Detector means are provided for stopping the machine if an insert is missed in any cycle, more than one insert or a doubled-over insert is withdrawn by the gripper, or if an insert of a different thickness than that normal to the group of inserts is gripped and withdrawn by the gripper. For this purpose, the gripper arm 104 carries thereon a longitudinally reciprocable control member 131 having its lower end portion operably connected to the jaw-actuating link 120. On its upper end portion, which extends part way up the arm 104, the control member 131 carries an adjustable actuating head 132 which engages a depending arm or a bell crank lever element 133 pivotally mounted on a horizontal axis on the arm 104 and having a forwardly extending second arm carrying a generally wedge-shaped trip dog 134 on its distal end portion. A normal bias as afforded by a tension spring 135 maintains the depending leg of the bell crank 133 in thrusting engagement with the actuator head 132 so as to be sensitive to reciprocal displacements of the control member 131 upwardly or downwardly from a mean adjustment, reflected in corresponding upward or downward swinging displacement of the trip dog 134.

Malfunction signaling means coactive with the trip dog 134 comprise a pair of gate lugs or dogs 135 and 137 which are accurately adjustably mounted on a lever 138 provided with a longitudinal adjustment slot 139 for this purpose. Conveniently, the lever 138 comprises an arm stationarily mounted as part of an assembly comprising a mounting bracket structure 139 having means journalling both of the shafts 105 and 115 therethrough whereby the arm 138 is maintained in a position wherein the gate dogs 135 and 137 are disposed to be coactive with the trip dog 134 in the rearward swinging movement of the gripper arm 104 in the insert withdrawing portion of its swinging cycle. Also carried by the mounting bracket 139 is a detector switch unit 140 having an actuator 141 which has a follower 142 engaging the arm 138 and normally holding the arm in a neutral, normal machine functioning position and relative to which the arm is swingable to a limited extent about its mounting axis which is coaxial with the shaft 105. For normal operation of the gripper, the gate dogs 135 and 137 are adjusted with respect to movement therebetween of the trip dog 134 without affecting the detector switch 140 when an insert of the predetermined thickness for which the dogs have been set is gripped by the gripper jaw 103 in the insert withdrawing stroke of the gripper cycle. Should the gripper miss withdrawing an insert for reasons of malfunction or because the insert bin or hopper is empty, engagement of the lower gate dog 137 by the trip dog 134 causes a swinging displacement of the arm 138 which thereby operates the actuator 141 to actuate the switch 140 to stop operation of the machine. On the other hand, if an overthick, double or folded insert is gripped by the gripping jaws 103, the trip dog 134 engages the lower gate dog 135 and again the switch 140 is actuated to stop the machine.

Means are provided for cooperation with the gripper 50 to avoid withdrawing double inserts and herein comprising and adjustable generally L-shaped separator finger 143 (FIGS. 5 and 9) pendantly mounted on a rock shaft 144 journalled in and between the portions of the machine frame 199 at each side of the insert hopper and adjacently above the lower front discharge or feed-out portion of the hopper. At one end, herein the left end as seen in FIGURES 5, 8 and 9, the rock shaft 144 carries a fixed crank arm 145 extending generally rearwardly and normally biased downwardly as by a tension spring 147 which similarly biases a generally downwardly extending follower link 148 carrying a follower roller 149 riding the perimeter of a disk cam 150 fixed corotatively on the adjacent end portion of the shaft 109. This cam 150 is contoured and timed to maintain the separator finger 143 normally with its rearwardly extending lower finger portion below the lowermost of the inserts in the magazine hopper. In timed relation with operations of the insert deflecting sucker 49, the cam causes the separator finger 143 to be withdrawn for deflection of the margin of the lowermost insert and then returned to maintain the next lowermost insert separated.

Where the inserts have an end fold, that is a portion at one end folded over or under and in such a location laterally relative to the gripper 50 that the fold of each insert is free from the gripper while being withdrawn, a desirable device is utilized to cooperate with the gripper in properly feeding the end folded inserts onto the table. In a desirable form, such device comprises an assembly 151 which is mounted on the lower front portion of the front insert magazine plate 98 and adjacent to that side of the magazine in which the end folds of the inserts are to be located. A mounting bracket 152 is secured to the magazine plate and projects forwardly below the rock shaft 144. Pivotally mounted on a vertical axis on the underside of the forward portion of the bracket 152 is a horizontal elongated plate 153 which projects away from the path of the gripper 50. On its free end portion, the plate 153 has a narrow turned up flange from which a finger 154 extends rearwardly to such an extent that by pivotally oscillating the plate 153 the finger will swing between the retracted full line position of FIGURE 6 and the projected dash outline position wherein it restrains the end folded portion of the next insert while the lowermost insert is being withdrawn and its folded end portion guided downwardly.

Actuation of the end fold finger assembly is effected in timed relation with operations of the sucker 49 and the gripper 50 by the rock shaft 144 through a substantially universal joint articulated motion transmission connection 155 pivotally connected at one end to the finger plate 153 and at its opposite end to a connector 157 fixed on the shaft 144, substantially as shown. Thereby the end fold finger device 151 is operable in unison with the rocking movements of the shaft 144. Although in FIGURE 5 the end fold finger device 151 is shown as mounted at the right side of the insert magazine, such device may be mounted at the left side if desired, with such modification of the plate member 153 and the finger 154 as to accommodate such disposition, namely, located toward the left of the bracket instead of toward the right of the bracket as shown.

Either the separator finger 143 or the end fold finger 151 may be used alternatively while the other is disabled. To impart proper cyclical movements for the end fold finger assembly 151 a control cam 150', shown in FIGURE 8, contoured to afford a substantial dwell of the finger assembly in the withdrawn relation of the finger is provided as a substitute for the cam 150.

For efficient transportation of the insert deposited on the table 35 by the gripper 50, the endless conveyor belt 51 is of suitable frictional surface material such as rubber and is mounted with its transporting run parallel with and slightly above the plane of the table 35, with such transporting run accommodated in a slot 158 (FIG. 4) in the table. Adjacent to the magazine hopper, the conveyor belt 51 is trained over an idler pulley 159 carried by one of the posts 101. Adjacent to the inserting station 42, the conveyor belt 51 is trained over a driving pulley 160 (FIGS. 7 and 16) conveniently carried by another of the posts 101.

In order to clear the press-down roller 52 above the belt 51 while an insert is being fed onto the table, means are provided synchronized in operation with the gripper 50 and comprising a carriage 161 (FIGS. 4 and 5) mounting the press-down roller and supported by a rearwardly extending arm 162 having rearwardly of the read edge of the table 35 a downwardly extending lever portion 163 pivotally attached to the lefthand leg of the frame 99 and carrying a follower roller 164 at its lower end riding the perimeter of a disk cam 165 mounted fixedly on the cam shaft 113. This cam is so contoured, as shown, that as the gripper 50 draws an insert into position over the conveyor belt 51, the press-down roller 52 is rocked upwardly as shown in dash outline in FIGURE 4 into ample clearance position. Quickly after the insert has been released by the gripper, the press-down roller 52 is dropped down into thrusting engagement with the running conveyor 51 to effect transport of the insert toward the inserting station. Firm press-down clamping action of the roller 52 is afforded by biasing the rockably mounted roller carriage as by means of a tension spring 167 acting on the lever arm 163.

Conveniently the stop 53 comprises an upwardly projecting finger on a generally L-shaped arm 168 which is vertically adjustably secured to the lever arm 163. Thereby the stop finger 53 is projected upwardly through a clearance aperture 169 in the table 35 simultaneously with lifting of the roller 52, and is depressed below the table as the roller 52 makes press-down contact with the insert.

Mounting of the press-down, insert register roller 52' is through means of a vertical holder 170 (FIGS. 4, 8 and 9) suitably mounted on a cantilever supporting frame arm 171 projecting forwardly from the lefthand portion of the insert magazine frame 99 over the path of travel of the inserts to the inserting station. It may be noted that for maximum efficiency, while the press-down register roller 52 thrustingly opposes the pulley 159, the press-down roller 52' thrustingly opposes the pulley 160.

For protectively enclosing the mechanism associated with the insert station 40 above the table 35, enclosing hood structure 172 (FIGS. 3 and 5) is provided.

*Envelope supply station*

Rigid mounting of the rear, fixed envelope magazine hopper plate 58 is on a horizontal bar 173 (FIGS. 1 and 3) mounted at a suitable elevation above the table 35 on an upstanding supporting bracket 174 at its right end and at its left end to the cantilever bracket arm 171. This bar provides a rear envelope shelf on which the flap edge margin of the lowermost envelope in the stack rests. Mounting of the envelope hopper side plates 59 and 60 is on respective brackets 175 and 177 which have rearwardly extending portions slidably resting on the bar 173 and rearwardly therebeyond carrying respective rigid nuts 178 having threaded therethrough a lefthand-righthand adjusting screw 179 having its end portions journalled in respectively the bracket 174 and the bracket arm 171. At its left end, the adjusting screw 179 has an adjusting knob 180 rigid thereon and at its right end the screw has a manual adjusting wheel 181 thereon. By turning the screw 179 adjustment for length of envelope is effected between the side hopper plates 59 and 60.

Means for assuring separation of the lowermost envelope from the next adjacent envelope in the stack while being pulled down by the sucker assembly 63, comprise the tips of adjustably mounted screws 182 carried in opposed coaxial relation in threaded engagement through the brackets 175 and 177 and the respective lower end portions of the hopper side plates 59 and 60.

A front ledge 183 for the envelopes is provided by a horizontal ledge bar 184 carried by the front hopper plate 61 and aligned in a plane with the ledge or shelf afforded by the rear bar 173. At its lower end, the front hopper plate 61 is mounted on an adjustable bracket 185 to which is also attached the envelope guide bar 73 which adjacent to its opposite end has a second adjustment bracket 187. Each of these adjustment brackets has a releasable securing device including a manipulating knob 188 and operable in a respective longitudinally extending slot 189 in the table 35.

Mounting of the envelope pull-down sucker assembly 63 is on the base 100 for vertical reciprocal movement through a clearance opening 190 in the table 35 (FIGS. 3 and 29). For this purpose, the sucker assembly 63 is mounted on the upper end of a vertical plunger 191 slidably reciprocably guided in a vertical hollow column 192 mounted at its lower end on the base 100. Pivotally attached to the lower end of the plunger 191 is a rock lever 193 which is pivotally mounted on a bracket 194 on the base 100 and biased by means of a spring 195 to follow a timing disk cam 197 fixedly corotative with the cam shaft 113. This cam is contoured to drive the envelope pull-down sucker assembly 63 to feed envelopes to the table 35 in timed relation with feeding of inserts from the insert hopper to the table.

Operation of the flap opening sucker 64 is effected in timed relation with the pull-down sucker assembly 63 while the pull-down sucker assembly still has the envelope in suctional grip upon engagement of the envelope with the table 35. Mechanism for operating the envelope opening sucker 64 includes a horizontal oscillatable shaft 198 (FIGS. 14, 24–26) journalled in a bearing bracket 199 carried by the right-hand portion of the frame 99 and carrying corotatively thereon a pinion 200 which meshes with a drive gear 201 to which is pivotally attached an eccentric arm 202 having thereon a follower 203 which rids the perimeter of a disk timing cam 204 corotatively mounted on the adjacent end portion of the cam shaft 113. Biasing means comprising a tension spring 205 maintain the follower of the eccentric rod 202 in engagement with the perimeter of the timing cam. As the eccentric 202 is oscillated by the cam 204, the flap opener 64 is swung between flap engaging full line position of FIGURE 25 and the envelope opening position shown in dash outline.

Timed with operations of the flap opener is the flap hold-down and guiding bar 65 which is conveniently in the form of a rod eccentric to a journal end portion 207 thereon journalled through a bearing bracket 208 (FIG. 26) and having thereon a rigid crank arm 209 (FIGS. 25, 26 and 32) pivotally connected to a vertical link 210 attached at its lower end to a lever 211 intermediately pivotally mounted on a bracket 212 and normally biased by a spring 213 to maintain a follower roller 214 in engagement with the periphery of a disk timing cam 215 corotatively mounted on the cam shaft 113. This cam effects operation of the flap bar 65 to raise the bar out of the path of the flap opener 64 and the envelope flap opened thereby, and to drop down in front of the opened flap to hold it open when released from the opening sucker 64. At its distal end portion, the flap bar 65 is turned down toward the table 35 to guide the flap toward substantially flat open position on the table.

Means are provided on the machine for detecting the absence of an envelope on the table at the proper time. While such detection means may be located at various places to be occupied by an envelope on and in its path over the table, it may conveniently be associated with the opener 64. To this end, should there be no envelope in position when the flap opener 64 moves into flap-engaging position, the malfunction detector operates to shut down the machine. Conveniently, such detector comprises a micro or snap switch 217 (FIGS. 3 and 26) mounted under the table 35 and having a switch actuator aligned with a hole 218 through which it is engageable by a yieldable trip 219 carried by the opener 64. Through this arrangement, the detector trip 219 yields on engagement with an envelope, but in the absence of an envelope extends through the opening 218 and trips the switch 217.

After the envelope has been released by the pull-down sucker assembly 63 and the flap opener 64, the envelope pusher or kicker 67 is actuated in timed sequence through the mechanism depicted in FIGURES 14, 30 and 31. A principal element of the kicker 67 comprises an envelope pushing finger 217 depending from a supporting bar or arm 218 through a longitudinal clearance slot 219 in the table 35. Ahead of the finger 217 on the arm 218 is a press-down roller 220 which rides onto the adjacent or trailing margin of the envelope 57 and holds it firm ahead of and while the flap opener 64 functions and continues to hold the envelope when the pusher finger 217 advance the envelope.

Reciprocation of the kicker in a cycle including an envelope feeding stroke and a return stroke comprises a rock lever 221 projecting upwardly from the base 100 through a longitudinal clearance slot 222 in the table 35 and having on its upper end a kicker head 223 on which the arm 218 is longitudinally adjustably mounted. Quick releasable locking means in the head 223 are conveniently operable through a lever 224 manually engageable externally of the head, whereby accurate adjustments of the kicker assembly can readily be made by loosening the rod 218 and then tightening the locking structure. At its lower end, the kicker rock lever 221 is mounted fixedly on a horizontal shaft 225 journalled in a bracket 226 carrying a fixed rocker arm 227 having pivotally connected thereto a coupling element 228 of a flexible or swivel motion transmitting connection with the end of the long arm of a bell crank actuating lever 230 which is pivotally mounted for vertical reciprocation on a bracket 231 and is normally biased by means of a compression spring 232 for operative engagement of a short follower arm against the perimeter of a disk timing cam 233 which is corotatively mounted on the cam shaft 113. Through this arrangement, each successive envelope is fed by the kicker assembly 67 forwardly to the nip of the press-down roller 68 for onward transportation by the conveyor belt 69.

Mounting of the envelope conveyor belt 69 to run in a conveyor span from the envelope station 41 to the stacker station 44 is over an idler pulley 234 (FIGS. 14 and 17) carried rotatably on one of the several posts 101 adjacent to the envelope station and a drive pulley 235 mounted on a bracket 237 suitably secured to a stacker frame 238 at the opposite end. Intermediately, the return run of the endless conveyor belt 69 runs over an adjustable take-up idler 239. For clearing the conveying run of the belt 69 to project slightly above the plane of the table 35, the table is provided with a longitudinal slot 240.

*Inserting station*

Mounting of the envelope stop 71 retractably in position to engage the leading end of the envelope on leaving the press-down roller 70, is desirably effected by means including a longitudinally extending lever 241 of which the stop comprises a downwardly directed terminal portion (FIGS. 3 and 17). An elongated longitudinally adjustable horizontal supporting arm 242 has a downwardly turned terminal portion 243 to which the stop lever 241 is intermediately pivotally connected so that the stop terminal 71 can be depressed into envelope stopping position or retracted by pivoting of the lever 241. As shown, the stop 71 is on that portion of the lever 241 which projects leftwardly relative to the inserting station 42, and the supporting arm 242 extends a substantial distance therebeyond and is carried by a horizontally parallel supporting head 244 along which the arm is adapted to be adjustably secured by means including a manually engageable knob 245.

Actuation of the envelope registering stop 71 is effected through an arm 247 (FIGS. 3, 11, 13 and 17) which has a forward end carrying the head 244 and extends rearwardly and downwardly to a fixed supporting shaft 248 on which it is pivotally mounted and has a downwardly projecting end portion carrying a follower 249 which rides the periphery of a disk timing cam 250 corotatively mounted on a cam shaft 251 journalled in the frame 238. Biasing of the follower end portion of the cantilever arm 247 towards the cam 250 is effected by a compression spring 252.

On rocking of the lever arm 247 upwardly, a tension spring 253 connected between the supporting arm 242 and an upwardly extending ear lug 254 on the upper side of the stop bar 241 swings the stop bar about its pivot to depress the stop finger (or dog) 71 into envelope registering position. Downward rocking of the cantilever arm 247 causes the stop arm 241 to be rocked about the axis of a roller 255 carried by the stop arm between its pivot and the stop finger 71 but more closely adjacent to the pivot. The range of vertical movement effected in the head 244 by the rock lever 247 is such that the roller 255 remains in thrusting engagement against the conveyor belt 69, and the length of the stop finger 71 is less than the radius of the roller 255. Accordingly, when the stop-carrying head is lowered, the stop arm 241 is caused to rock about the pivot of the roller and the stop finger 71 is raised to clear the stopped envelope for onward movement by the conveyor belt 69. Such onward feeding of the envelope from the inserting station 42 to the stacker station 44 is rendered quite positive by pressing thereagainst of an auxiliary roller 257 carried by the end portion of the arm 241 opposite the stop finger 71, as an incident to release of the stop finger. This auxiliary roller 257 together with the roller 255 is raised out of engagement with the envelope and spaced above the conveyor belt 69 when the stop finger is depressed into envelope stopping and registering position.

As the envelope 57 is fed along the guide bar 73, its longitudinal closed or bottom margin is guidedly held flat with the table 35 by an overlying longitudinal guide flange 258 (FIGS. 7, 9 and 28). At the same time, as previously explained, while the envelope is registered or aligned with the inserting station 42 its open flap guidedly underlies the forward margin of the hold-down plate 72. Supportingly underlying the envelope flap in spaced relation below the plate 72 is a downwardly offset flange portion 259 of the table 35.

As the envelope is stopped in registration or alignment with the insert to be stuffed thereinto, the envelope flap is clamped against the underside of the overlying hold-down plate 72 by means comprising a clamping bar 260 operable through a clearance opening 261 in the supporting flange 259 and carried by an upwardly extending rear end portion of a forwardly directed rock lever 262 having its front end portion pivotally mounted on a bracket 263 rising from the base 100. Rocking of the lever 262 timed with feed-in and dwell of the envelope in the inserting position is effected by a timing cam 264 corotative on the cam shaft 113 and acting on an actuating bell crank 265 mounted pivotally on a bracket 267 and connected by a link 268 to the rocker arm 262. Biasing means comprising a compression spring 269 normally urges the actuating lever 265 upwardly. Through this arrangement, the envelope flap is clamped firmly to avoid buckling of the envelope during filling of an insert thereinto.

Should it become necessary for any reason to remove the envelope manually because of malfunction, or during set-up, or the like, the clamping member 260 is adapted to be manually released by means comprising a release lever 270 extending from a pivotal connection at one end to the bracket 267 to a position adjacent the forward underside of the table 35, and with an intermediate pivotal connection to the rock lever 262. Through this arrangement, depression of a button 271 attached to the front end of the release lever and accessible from on top of the table 35 (FIGS. 2, 3 and 28) causes the rock lever 262 to be depressed in opposition to the spring 269 and releases the clamping bar 260 from the envelope flap. This enables the envelope to be withdrawn manually or adjusted longitudinally while setting up the machine. Upon clamping of the envelope flap by the clamping bar 260, operation of the envelope opening suckers 74 is effected. Three of the suckers 74 are provided for efficiently engaging the back of the envelope at three spaced places adjacent to the envelope mouth. Each of the suckers 74 is adjustably mounted so that the set of suckers can be properly arranged for accommodating envelopes of various sizes and cut of the mouth area of the back. For this purpose each of the suckers has a longitudinally slotted carrying bar 272 engaged by a releasable manual securing knob 273 for longitudinal adjustment on a respective clamp structure 274 which, by the same knob 273, is adjustably secured in a preferred rotary and longitudinal position on a bail-like tube supporting frame bar 275 which is disposed in suitable spaced overlying relation to the position occupied by the registered envelope and has downwardly extending spaced apart end portions 277 which are vertically adjustably secured to respective generally oppositely extending arms of a carriage member 278 mounted on a vertical plunger 279 reciprocably guided in a hollow column 280 mounted on the base 100. Reciprocations of the plunger 279 are effected by a bell crank lever 281 pivotally connected at one end to the plunger and intermediately pivotally mounted on the bracket 267 and having a follower arm engaging the periphery of a timing disk cam 282 corotatively mounted on the cam shaft 113. A biasing compression spring 283 normally urges the actuating bell crank 281 upwardly. In a cycle of operation, the cam 282 causes the envelope opening sucker assembly to be depressed as shown in FIGURE 7 so that the suckers engage the envelope back and then causes the assembly to be raised as shown in FIGURE 9 to open the envelope.

Conveniently, the sucker supporting bar 275 is tubular, with one end closed and the opposite end provided with a nipple 284 by which a suction air hose 285 is adapted to be attached. Each of the suckers 74 has a flexible tube 287 connecting it operatively with a supply nipple 288 on the bar 275.

As the envelope is opened, the insert guiding fingers 75 are projected into the open mouth adjacent to the respective suckers 75, there being, as shown in FIGS. 2 and 3 an equal number of suckers and fingers, in this instance three. Conveniently the fingers 75 are of resiliently flexible flat strip material of sufficient length for the purpose, and each provided with a forward turned up distal terminal, with the opposite, proximal ends of the fingers fixedly secured to respective depending bracket arms 290, and at least the left hand one of which has a clamping head including a manually releasable securing knob 291 by which it is adjustable along the length of a rock shaft 292 extending parallel to the conveyors 51 and 69 and overlying the envelope opening sucker assembly. One end of the shaft 292 is journalled in the cantilever frame bracket 171 (FIGS. 3 and 7) and its opposite end is journalled in a bracket plate 293 (FIGS. 3, 11 and 20) mounted on the frame 238. Rocking of the shaft 292 is effected by means including a crank arm 294 adjustably secured to the shaft adjacent to the bracket 293 and connected by a link 295 to an actuating lever 297 intermediately pivoted on the shaft 248 and carrying a follower 298 which rides the perimeter of a disk timing cam 299 corotatively secured to the cam shaft 251, with a biasing spring 300 normally urging the follower end portion of the lever 297 toward the cam. Through this arrangement the fingers 75 are rocked into and out of insert guiding relation to the mouth of the envelope in timed relation with the suckers 74.

Mounting of the hold-down brush 54 is desirable by means of a cantilever supporting rod 301 (FIGS. 7 and 9) adjustably secured to a mounting bracket 302 carried by the rear end portion of the insert supporting plate 72.

Adjustable mounting of the insert stop 55 (FIGS. 3 and 7) is by means of a rod 303 extending through a suitable bracket 304 mounted on the plate 72 adjacent to its left side. Adjustments of the stop bar 55 are fixed by a releasable elongated set screw 305 having a manipulating knob on its upper end.

In timed relation to opening of the envelope, operation of the insert pusher fingers 77 is effected. To this end, each of the fingers 77 is elongated in a front-to-rear direction and is fixedly adjustably attached at its rear end portion to project cantilever fashion forwardly from a horizontal supporting rod 306 (FIGS. 3, 7 and 9) which is engaged at least in respect to the left hand finger by a suitable clamping structure on the finger adjustably secured by means including a manually engageable knob 307. Thereby, the fingers 77 are accurately aligned both transversely and vertically to ride in shallow respective front-to-rear grooves 308 depressed in the plate 72. As best seen in FIGURE 3, three of the inserting fingers 77 are provided, two being located to the left of the brush 54 and one being located to the right of such brush, leaving an area of the plate 72 clear under the touching downwardly and leftwardly angled along, flexible bristles of the brush.

Reciprocations of the inserting fingers 77 are effected in timed relation with the gripper 50 so that as the gripper moves outwardly or forwardly in a feeding stroke, the fingers 77 are retracted rearwardly for feeding by the conveyor 51 of the insert into the transverse path of the insert fingers; and as the gripper is swung inwardly toward the insert hopper, the insert fingers drive the aligned insert into the aligned or registering envelope. For this purpose, a depending actuating arm 309 (FIG. 7) is rigidly attached to the oscillatably rotatable drive shaft 115. At its lower end, the actuating arm 309 is connected to a motion transmitting link structure 310 pivotally engaging the finger rod 306.

In order to clear the inserting fingers 77 above the insert plate 72 in the return stroke to enable feeding of a succeeding insert into inserting position, means are provided for raising the inserting finger assembly during each operating cycle. In a simple and efficient construction, a horizontal front-to-rear guide rail 311 is provided alongside the rear end portion of the right-hand side inserting fingers 77 and providing a guide channel opening toward such finger for riding within the channel of a runner block 312 on the opposed side of the finger. Raising and lowering of the rail 311 is effected in properly timed relation by a timing disk cam 313 corotatively mounted on the cam shaft 113 and peripherally engaged by a follower 314 on a reciprocable plunger bar 315 guided for generally up and down movement in a guide bracket structure 317 mounted on the adjacent portion of the frame 99 and biased by means of a tension spring 318 toward the timing cam. On its upper end portion, the plunger bar 315 is rigidly connected to the guide rail 311 by an arm 319 which in this instance extends forwardly. By having the actuating plunger bar 315 oriented in a generally rearwardly slanting relation, as shown, a component of forward movement is imparted to the rail 311 during downward or descending movement and a corresponding component of rearward movement is imparted during upward or raising movements thereof, thereby enabling use of a shorter rail for the desirable length of travel of the fingers 77 and affording clearance at the front end of the rail in respect to other mechanism located adjacent thereto. The distance of travel of the rail in a front-to-rear direction can be visualized on comparison of FIGURES 7 and 9. Through this arrangement, the insert pusher fingers 77 are dropped to insert pushing position timed with the start of their forward stroke, and the fingers are raised timed with their return stroke.

Means are provided for detecting a jam incident to the inserting operation. For this purpose, a feeler or detector arm 320 in the form of a rod extending longitudinally parallel with the path of movement of the envelopes is journaled in a bearing block 321 carried by the front end portion of the bracket arm 171 and has a downwardly and forwardly extending detector or trip foot 322 overlying the mouth portion of each envelope to be filled. Means for adjusting the detector arm vertically include a manually operable screw member 323 coacting with the bearing member 321 and the bracket arm 171.

A signalling device operable by the detector arm 320 for stopping the machine when a jam is detected comprises a microswitch 324 mounted on the upper end portion of the bearing member 321 (FIG. 4) and having an actuating arm 325 which is engaged by the head end portion of a trip arm 327 adjustably secured fixedly on the detector arm 320 and thereby swingable to actuate the switch 324 when the detector foot 322 is lifted as a result of a document jam.

*Flap moistener*

After each envelope has been filled, if its flap is to be moistened for sealing, the flap moistener assembly 43 is activated. This assembly includes a suitable water tank 328 (FIGS. 2 and 3) connected by a duct 329 to the moistener 80. A manual shut-off valve 330 is provided for closing the conduit passage when the moistener is to be disabled. In addition, a solenoid valve 331 is provided in the duct 329 to close the same automatically in the event of a malfunction in the machine or when the machine is stopped for any other reason. As the envelope flap emerges from under the left side of the hold-down portion of the insert plate 72, it moves over a supporting plate 332 under the moistener 80 and having a rear guide flange 333 turned up and angled toward the flap closer bar 82, the deflector tip 81 of which is received in a socket 334 provided in the adjacent portion of the plate 332.

*Stacker assembly*

As the filled envelopes successively leave the inserting or filling station 42, upon release from the stop 71, the conveyor belt 69 transports the envelopes under the cooperating press-down rollers 79 which are mounted on a carriage 335 (FIGS. 1, 3 and 17) carried at the forward end of a cantilever arm 337 which extends forwardly from a shaft 338 (FIG. 11) which is non-rotatably mounted on and across the top portion of the frame 238.

As the filled envelope is moved by the longitudinal transport conveyor 69 and the press-down rollers 79 into stacking registration in the stacker assembly 44, the press-down rollers 88 of the take-away roller assembly are in an elevated position as shown in dash outline in FIGURE 12 and then descend into envelope engaging position thrustingly toward the take-away roller 87. To this end, the press-down rollers 88 are journalled on respective upwardly extending studs 339 vertically adjustably fixed on a head 340 on the forward end portion of a rearwardly extending cantilever arm 341 (FIGS. 3 and 10–12) fixedly secured as by means of a flange 342 to a rocker yoke 343 overlying and journalled on the shaft 338. For timed rocking of the yoke 343 an actuating arm 344 is attached to its right-hand end and extends generally downwardly, with a follower 345 on its lower end portion riding the perimeter of a disk timing cam 347 corotatively fixed on the cam shaft 251. A compression spring 348 normally urges the arm 344 toward the timing cam. Through this arrangement, as the envelope is fed into position in the stacker area of the table 35, the press-down rollers 88 have been rocked to their clearance position. Just as the envelope comes to a halt against the stop 85, the press-down rollers 88 are depressed into coactive thrusting relation to the take-away roller 87 which is in continuous rotation as driven by means of a sprocket chain 349 trained over a sprocket 350 on the left-hand end of a shaft 351 by which the roller 87 is journalled on the frame 238.

For driving the chain 349 it is trained over a sprocket 352 mounted corotatively on a shaft 353 which corotatively carries the stacker roller 89 (FIGS. 10 and 11) and which in turn is driven through a larger sprocket 354 corotatively fixed thereon and over which a drive chain 355 is trained. If desired, there may be a differential in the diameters of the sprockets 352 and 354, so that the stacker roller 89 and its companion 90 are driven at a greater speed than the take-away rollers 87 and 88 whereby stacking transport of the envelopes may be accelerated.

A yieldable pressure of the stacker roller 90 against the stacker roller 89 is afforded by having the roller 90 carried rotatably at its opposite ends by respective arms 357 which are journalled on the shaft 338, and with tension springs 358 acting to draw the roller 90 yieldably into thrusting engagement with the driven roller 89.

As best seen in FIGURE 11, means are provided for preventing return or backfeeding of the envelopes under the driven roller 89. For this purpose, this roller is provided with a transverse spaced series of annular grooves 359 and the supporting frame 238 is provided with stop deflector pins or projections 360 along the bottom of the roller.

Conveniently, driving of the cam shaft 251 is effected by means of a pinion 361 (FIGS. 11 and 12) mounted on the right end portion of the roller shaft 353 and meshing with a transmission gear 362 freely journalled on the fixed shaft 248 and meshing with a driving gear 363 corotatively attached to the cam shaft 251. In turn, the cam shaft 251 through a sprocket 364 (FIGS. 11 and 20) drives a sprocket chain 365 trained thereover and over a driving sprocket 367 on the cam shaft 113 which is thereby driven in unison with the cam shaft 251.

Conveniently the overhead deflecting finger 92 is mounted in vertically adjustable position on the yoke 343. For this purpose, an upwardly extending longitudinally slotted bar 368 is mounted centrally on the yoke 343. At its front end, the deflector finger is secured to a bracket 369 which is vertically adjustably attached to the supporting bar 368 by suitable means including a manually operable clamping knob 370.

As best visualized in FIGURES 3 and 10, the envelope stacking kicker finger 94 projects upwardly through respective front-to-rear longitudinal slots 371 in the bottom plate defining the stacking receptacle 91. These fingers extend upwardly immediately behind and to a slightly lower elevation than the top of the driven stacker roller 89 and are reciprocated from a forward retracted position adjacent to the roller to a rearward envelope stacking position in timed sequence with delivery of successive filled envelopes into the stacker receptacle. That is, as each envelope leaves the stacker rollers 89 and 90 in a generally upward and rearward direction into the generally L-shaped deflector 92, the fingers 94 are in retracted position and as the envelope quickly drops bottom edge first onto the bottom of the stacker receptacle 91, the fingers 94 thrust rearwardly to drive the envelope against the stack.

For unison actuation of the kicker fingers 94, they are carried in spaced parallel coextensive relation by a body 372 (FIGS. 10, 14 and 18) which is rockably mounted for oscillation about a horizontal axis transverse to the stacker receptacle 91 on a bracket 373 mounted on the base 100. Biasing means comprising a tension spring 374 acts normally to pull the body 372 into the retracted position of the fingers 94, as shown in dash outline in FIGURE 18. Timing reciprocations of the fingers is effected by means of a timing disk cam 375 carried corotatively by the cam shaft 113 and the periphery of which is engaged by a follower 377 projecting generally rearwardly from the body 372.

*Power drive mechanism*

Power for driving the machine is derived from an electric motor 378 (FIGS. 14 and 15) mounted on the base plate 100, conveniently in the front left-hand portion thereof, with the motor shaft extending leftwardly therefrom and having coupled therewith a magnetic clutch 379, whereby the motor can run continuously once it is started but the machine can be stopped instantaneously by declutching from the motor drive shaft. Coaxial with the motor drive shaft and clutched thereto by the clutch 379 is a stub shaft 380 journalled in a bracket structure 381 and carrying corotatively a driving wheel in the form of a pulley 382 over which is trained a flexible transmission element comprising a belt 383 (FIGS. 10 and 20) which is trained over one side of a double groove pulley 384 journalled on a yoke 385 which is pivotally mounted on a bracket 387 at the base of the supporting frame 238. Trained over the other side of the transmission pulley 384 is a drive belt 388 which is, in turn, trained over a drive pulley 389 (FIG. 14) corotative on a shaft 390 journalled through the base of the frame 238. For selection of the speed at which the machine is to be run rockable adjustment of the yoke 385 is effected by means of an adjusting screw 391 comprising a rod threadedly connected at one end to the top of the yoke 385 and extending rearwardly and downwardly in journalled supported relation through a bracket 392 for ready manipulation at the rear of the machine. A thrust collar 393 fixed on the adjustment screw shaft 391 abuts the rear of the bracket 392 and biasing means comprising a compression spring 394 thrusts at one end against the front of the bracket 392 and at its opposite end against a forwardly spaced fixed collar 395 on the rod 391.

At its left end, the shaft 390 carries corotatively a sprocket gear 397 (FIG. 10) over which is trained the drive chain 355. Corotatively fixed on the right end of the shaft 390 is a bevel pinion 398 (FIGS. 14 and 20) meshing with a bevel gear 399 fixed on a front-to-rear continuously running conveyor belt drive shaft 400 carrying corotatively on its front end a sprocket gear 401 over which is trained a sprocket drive chain 402 which runs over and drives a sprocket 403 on the shaft which supports the envelope transport belt pulley 235.

Adjacent to the bevel gear 399, the shaft 400 carries corotatively a driving sprocket 404 over which is trained a driving chain 405 running over a sprocket wheel 407 (FIGS. 8, 9 and 14) corotatively mounted on the shaft of the belt driving pulley 160.

For machine set-up and other purposes, it is desirable to provide means for manually operating the power drive mechanism, and for this purpose the outer or left end of the drive shaft 380 is provided with a releasable crank connection 408 (FIGS. 14 and 15) with which a hand crank 409 (FIGS. 2, 3 and 14) is selectively engageable for turning the power train operated through the shaft 380. Sometimes it is desirable to effect adjustments through use of the crank 409 while the machine is under power drive of the motor 378 and without shutting down the motor. Therefore, a disconnect safety switch 409a is provided which is mounted on the shaft supporting bracket structure 381 in such position that it is actuated by the crank 409 when the crank is coupled with the connector 408 for thereby automatically stopping the machine by disconnecting the clutch 379.

*Pneumatic system*

Vacuum for the several sucker assemblies is provided by a vacuum pump 410 driven by a right-hand extension of the drive shaft of the motor 378 (FIGS. 14 and 15). This pump has an exhaust assembly 411 and an intake or suction assembly 412. Connected to the suction or intake assembly 412 is an air hose 413 which has branches leading from respective distributor valve assemblies 414 and 415 which are operatively associated with the cam shaft 113 at suitably spaced longitudinal intervals therealong.

For a more detailed understanding of the valve assemblies 414 and 415, which are essentially similar in construction, reference is made to FIGURES 21–23 wherein the valve assembly 414 has been chosen as representative. It comprises a body block 417 mounted fixedly on the base plate 100 and providing therethrough a clearance bore 418 through which the cam shaft 113 extends freely. Flat oppositely facing valve surfaces 419 normal to the axis of the shaft 113 are provided on the body 417. One branch of the suction air hose 413 is attached to a nipple 420 communicating with a suction port 421 in the body 417 and having respective branches 422 leading from the valve faces 419. One of the valve faces 419 is engaged by a distributor disk 423 in slidably lapped engagement. The opposite face 419 is engaged in slidably lapped relation by a similar distributor disk 424. Each of the disks 423 and 424 is corotatively coupled with the shaft 113 by means of an adjustably attached crank arm 425 having an end notch 427 within which is engaged a crank pin 428 fixedly secured to the associated valve plate or disk on an axis eccentric to the shaft 113. Engagement of the pin 428 in the notch 427 permits axial movement of the valve disk 424 relative to the crank arm 425 whereby to permit automatic lapping-in take-up of the valve disk surface in engagement with the associated valve face 419 through biasing means such as a compression spring 429.

In the illustrated example, the vacuum valve assembly 414 is arranged for control by the valve disk 423 of suction in the insert hopper sucker 49, and the valve disk 424 is responsible for controlling suction of the envelope opening suckers 74. By way of example the valve face of the insert hopper sucker controlling disk 423 is provided with a suitably shaped recess 430 which is arranged to register with the suction port branch 422 for a suitable interval in each cycle of operation timed with the sucker 49. At the same time, a suction port 431 in the body 417 spaced in radial alignment with the vacuum branch 422 registers with the recess 430 whereby a suction passage is completed through a nipple 432 with a suction conduit 433 connecting the sucker 49. An extension 434 of the recess 430 in the trailing direction with respect to rotation of the disk leads beyond the cut-off point with respect to the vacuum port 422 and is aligned with a positive suction release port 435 extending through the valve disk to atmosphere and which registers with the suction port 431 in the continuing rotation of the disk to effect proper timed release of the sucker 49 from the insert which it has deflected into the path of the insert gripper. Similar appropriate valve recessing of the envelope opening sucker controlling vacuum valve disk 424 is provided whereby vacuum control is afforded through the associated vacuum port 422 and a suction port 437 in the valve body 417 with which communicates the vacuum hose 285 leading to the envelope opening suckers.

In respect to the vacuum valve assembly 415, a rotary valve disk 438 controls suction in the envelope flap opening sucker 64 through a suction hose conduit 439. A second rotary control valve disk 440 controls suction through a vacuum duct hose 441 leading to the suckers of the envelope hopper feed assembly 63.

*Electrical control circuit*

Electrical power is adapted to be derived from any suitable source such as the customary AC house current through a suitable electrical conduit 442 (FIGS. 14, 15 and 33) having the usual plug 443 to be inserted in an outlet receptacle. Primary control over the electrical circuit is through a master switch 444, the actuator of which, similarly numbered, is suitably located on the front portion of the table 35 (FIGS. 1 and 3). Closing of the switch 444 completes a circuit through the motor 378 and through a full wave rectifier 445 provided to supply DC current to the power driving system clutch 379. Normally, however, the clutch remains deenergized and the machine remains inactive until a normally open starting switch 447 is closed by pressing a button 448 which is suitably mounted on the front portion of the work table 35. This completes a circuit through a relay 449 to close normally open relay holding contacts 450 in a shunt around the starting switch 447 and to close normally open contacts 451 in the clutch circuit. This also energizes the flap moistener water control solenoid valve 331. If it is desired to stop the machine for any reason without stopping the motor 378, a normally closed stop switch 452 in the shunt having the relay holding contacts 450 is adapted to be opened by pressing a button 453 conveniently located on the front portion of the work table 35. Further, deenergization of the relay 449 to stop the machine is effected upon opening of any one of the malfunction detector switches comprising the miss or double detector switch 140, the envelope flap detector switch 217 and the jam detector switch 324, or the handle safety switch 409a all of which are in series in the relay circuit. Resumption of operation can then be effected by closing the starting switch 447.

If desired, a suitable insert card feed device may be installed as optional equipment in the inserting station. Further, if desired a suitable counter may be installed at a suitable location.

It will be understood that modifications and variations may be effected without departing from the scope of the novel concepts of the present invention.

We claim as our invention:

1. A compact low cost inserter comprising a generally rectangular base plate elongated from side-to-side and narrowest in a front to rear direction,
    a working table supported in spaced relation above and within the perimeter of the base plate,
    an envelope supply magazine supported over the working table adjacent to the front portion of one side thereof,
    an insert supply station mounted over the table rearwardly in alignment with said envelope magazine,
    an inserting station on the central area of the table alongside said magazine and supply station,
    means operative to deposit successive envelopes from the magazine and successive inserts from the supply station concurrently on the working table,
    means operative to transport concurrently deposited envelopes and inserts substantially simultaneously to the inserting station,
    respective stops engaging the envelopes and the inserts in front-to-rear alignment in the inserting station,
    means operative to open the respective envelope with the opening facing rearwardly,
    means operative to thrust the aligned insert forwardly into the opened envelope,
    the envelope stop means being operative to release the filled envelope,
    a stacker station located alongside said inserting station over the opposite side of the table from the magazine and supply station and having a receptacle at the rear of said table,
    means effective after the envelope is released from its stop means to transport the filled envelope into the stacker station along the front of the table and into alignment with said receptacle,
    means comprising part of the stacker station and operative to move the filled envelope rearwardly into said receptacle,
    frame structure rising from said base plate and in part mounting said stacker station,
    cam means including a first cam shaft supported by said frame structure,
    additional cam means including a second cam shaft supported by said base plate,
    a driving motor on said base plate,
    and power transmission means connecting said motor with said envelope moving means of the stacker as well as with said envelope and insert transport means as well as said cam shafts,
    said cam shafts and the cam means carried thereby being operative to drive all of the remaining means.

2. A compact low cost inserter comprising a generally rectangular base plate elongated from side-to-side and narrowest in a front to rear direction,
    a working table supported in spaced relation above and within the perimeter of the base plate,
    an envelope supply magazine supported over the working table adjacent to the front portion of one side thereof, an insert supply station mounted over the table rearwardly in alignment with said envelope magazine, an inserting station on the central area of the table alongside said magazine and supply station, means operative to deposit successive envelopes from the magazine and successive inserts from the supply station concurrently on the working table, means operative to transport concurrently deposited envelopes and inserts substantially simultaneously to the inserting station, respective stops engaging the envelopes and the inserts in front-to-rear alignment in the inserting station, means operative to open the respective envelope with the opening facing rearwardly, means operative to thrust the aligned insert forwardly into the opened envelope, the envelope stop means being operative to release the filled envelope, a stacker station located alongside said inserting station over the opposite side of the table from the magazine and supply station and having a receptacle at the rear of said table, means effective after the envelope is released from its stop means to transport the filled envelope into the stacker station along the front of the table and into alignment with said receptacle, means comprising part of the stacker station and operative to move the filled envelope rearwardly in said receptacle, an elongated cam shaft mounted on said base plate and extending from side-to-side thereover under all of said stations, timing cams corotatively mounted on said shaft, respective actuators operated by said cams to control operation of components of all of said means in cyclically timed relation, and means driving said cam shaft.

3. A compact low cost inserter as defined in claim 2, having a pneumatic system including a vacuum pump and sucker structure associated with said envelope and insert depositing means and with said envelope opening means, and means connecting said vacuum pump with said sucker structure including valve structure operated by said cam shaft.

4. A low cost compact inserter of the character described comprising, a rectangular base plate, a working table supported in spaced relation over said base plate, an insert station located at one side along the rear of said table and including frame structure mounted on the base plate and rising above said table, means mounted on said frame structure for supporting a stack of inserts, means also supported by said frame structure and operative to remove the inserts one at a time to deposit the same onto the table, insert transporting means along the top of the table operative to move the deposited inserts laterally to a position generally centrally of the table, means also supported by said frame structure and providing an envelope magazine above said table forwardly from said magazine supporting structure, means carried by said base plate under said envelope magazine and operative through said table for withdrawing successive envelopes from the magazine and depositing them on the table, means operative to transport the envelopes along the table into alignment with respective inserts transported to said central portion of the table, means also carried by said frame structure and operative to fill the inserts into the aligned envelopes, a filled envelope stacker assembly comprising a second frame structure on the opposite side of the base plate from said first mentioned frame structure and rising above said table, means operative to transport filled envelopes into alignment in front of said second frame structure, means carried by said second frame structure operative to move the filled envelopes from the table into the stacker assembly, and driving means including driving transmission means carried by said second frame structure and having driving connections with said transporting means and with said insert withdrawing and depositing means and said envelope filling means.

5. In an inserter of the character described, a supporting frame, means on said supporting frame providing a magazine for supporting a stack of inserts with the lowermost insert facing downwardly, means for successively deflecting one margin of the lowermost of the inserts downwardly, a rock shaft mounted at an elevated position on said frame structure and having thereon a depending gripper arm having insert gripping jaw structure on its lower portion, means carried by the arm for actuating the gripper jaw, an oscillating shaft parallel to and adjacent to said rock shaft and drivingly coupled therewith, a rotary shaft on said frame structure below said magazine, a crank and link assembly connecting said rotary shaft with said oscillating shaft and operable to actuate said oscillating shaft and thereby the rock shaft in a cycle carrying said gripper arm between insert gripping position adjacent to the magazine and a release position spaced from the magazine in each complete rotation of said rotary shaft, means operative to actuate said jaw actuating means comprising a timing cam freely rotatably mounted on said rock shaft, and a driving coupling between said rotary shaft and said cam continuously rotating the cam with said rotary shaft.

6. In an inserter of the character described, a supporting frame, means on said supporting frame providing a magazine for supporting a stack of inserts with the lowermost insert facing downwardly, means for successively deflecting one margin of the lowermost of the inserts downwardly, a rock shaft mounted at an elevated position on said frame structure and having thereon a depending gripper arm having insert gripping jaw structure on its lower portion, means carried by the arm for actuating the gripper jaw, an oscillating shaft parallel to and adjacent to said rock shaft and drivingly coupled therewith, a rotary shaft on said frame structure below said magazine, a crank and link assembly connecting said rotary shaft with said oscillating shaft and operable to actuate said oscillating shaft and thereby the rock shaft in a cycle carrying said gripper arm between insert gripping position adjacent to the magazine and a release position spaced from the magazine in each complete rotation of said rotary shaft, means operative to actuate said jaw actuating means comprising a timing cam freely rotatably mounted on said rock shaft, a driving coupling between said rotary shaft and said cam continuously rotating the cam with said rotary shaft, and means carried in part by said gripper arm and in part by said rock shaft and said oscillating shaft for detecting the absence of an insert in the insert gripping jaws when closed or the presence of an overthick or double insert thickness in the jaw when closed and including:

a trip device comprising part of the detector means carried by the arm responsive to actuations of said jaw actuating means, and detector elements carried by that part of the detector means supported by said rock and oscillating shafts.

7. In an inserting machine of the character described, an insert supply station including an insert magazine, a receiving table aligned with said magazine, means for successively removing inserts from the magazine and depositing the same on the table, a transport conveyor belt running with its surface adjacently above said table and receptive thereon of inserts deposited on the table, press-down roller means including a carriage therefor operable to raise the roller means above said conveyor belt to receive successive inserts between the roller means and the belt and to then descend to press the roller means against the belt for transporting the insert, and a stop element carried by said carriage and movable into blocking relation to each insert as it is deposited between the conveyor belt and the raised roller means and to move out of such blocking relation on descent of the roller means into engagement with the conveyor belt, 8. In an inserting machine of the character described, an insert station, an envelope magazine aligned with said insert station, a receiving table disposed for receiving successive inserts and envelopes from the insert station and envelope magazine and the magazine being located over and spaced above the table, means for feeding successive inserts from the insert station onto the table and for pulling envelopes concurrently from the magazine downwardly onto the table, means for transporting the inserts from the insert station, and means for concurrently transporting the envelopes from the envelope magazine comprising:

a continuously running conveyor belt aligned with the magazine at the side thereof toward which the envelopes are to be transported, press-down roller means thrusting toward the conveyor belt, and a kicker assembly aligned with said belt operative under the envelope magazine to drive each successive envelope deposited on the table toward the conveyor belt and under said roller means.

9. In an inserting machine of the charter described, an insert station, an envelope magazine aligned with said insert station, an inserting station alongside said insert station and envelope magazine, means for concurrently feeding respective inserts and envelopes from said insert station and said magazine to said inserting station, means in the inserting station operative to align the respective insert and envelope, means adjacent to the envelope magazine for opening the flap of each envelope as deposited on the table, a flap hold-down plate overlying the flap of the envelope aligned in the inserting station, means movable into and out of flap clamping engagement with respect to the underside of said hold-down plate, means for opening the envelope in timed relation to clamping of the envelope flap, and means for thrusting the insert into the opened envelope.

10. In an inserting machine of the character described, an insert station, an envelope magazine aligned with said insert station, an inserting station alongside said insert station and envelope magazine, means for concurrently feeding respective inserts and envelopes from said insert station and said magazine to said inserting station, means in the inserting station operative to align the respective insert and envelope, means adjacent to the envelope magazine for opening the flap of each envelope as deposited on the table, a flap hold-down plate overlying the flap of the envelope aligned in the inserting station, means movable into and out of flap clamping engagement with respect to the underside of said hold-down plate, means for opening the envelope in timed relation to clamping of the envelope flap, means for thrusting the insert into the opened envelope, and means operative manually to release said flap clamping means.

11. An inserter of the character described comprising, an inserting station, an insert supply station, an envelope magazine, means for feeding respective inserts and envelopes concurrently to said inserting station, means for filling the respective insert into the envelope, and means for opening the envelope comprising:

a horizontal tubular bar extending in elevated relation across the path of movement of inserts into the envelope and having rearwardly and downwardly extending end portions along the respective opposite sides of said path and extending therebelow, means engaging the end portions and operable to move the bar in up and down reciprocal relation, suckers adjustably carried by said bar and directed downwardly for engagement with the envelope upon downward movement of the bar and for lifting the engaged wall of the envelope upon upward movement of the bar, suction ducts connecting the suckers with the inside of the tubular bar, one end of the bar being closed, and suction means communicating with the opposite end of the bar and connected to a source of vacuum.

12. In an inserting machine of the character described, an insert supply station, an envelope magazine, an inserting station, means for supplying inserts from the insert station to the inserting station, means for supplying envelopes from the envelope magazine to the inserting station including an oscillating envelope flap opening sucker, and an oscillating flap hold-down and guide bar operative in timed relation to the flap opening sucker for moving into position over opened envelope flaps to guide the same toward the inserting station.

13. In an inserting machine of the character described, an insert supply station, an envelope supply magazine, an inserting station aligned with said insert station and said magazine, means for transporting an insert and an envelope concurrently from said insert supply station and said magazine to said inserting station including a conveyor belt running from said magazine to said inserting station, and stop means including:

an assembly including a stop alongside said belt and press-down roller means over said belt to thrust an envelope against the belt for transport movement therewith, means for raising and lowering said assembly relative to the belt, and means in said assembly acting when the assembly is raised to move said stop into stopping position in the path of an envelope delivered to the inserting station by the belt, said stop moving out of said stopping position by lowering of the assembly and thrusting of said roller means against the envelope toward said belt.

14. In an inserting machine of the character described,
an insert supply station,
an envelope magazine,
an inserting station,
means for delivering respective inserts and envelopes from the insert station and the envelope magazine to the inserting station,
and means for inserting the insert into the envelope including:
   insert supporting means,
   a set of insert pushing fingers reciprocably movable along said supporting means,
   means supporting said fingers comprising a supporting bar and a runner and a track engaged by the runner, all located above said insert supporting means,
   means operative to reciprocate said bar, the runner and the fingers along said track to move the fingers in insert pushing and return strokes along said supporting means,
   and means operative to raise the track and thus raising the fingers above said insert supporting means during return strokes of the fingers to enable a succeeding insert to be received on said insert supporting means and to lower the track and thereby lower the fingers into insert pushing position relative to said insert supporting means for the insert pushing strokes of the fingers.

15. In an inserting machine of the character described,
an insert supply station,
an envelope magazine,
an inserting station,
means for delivering respective inserts and envelopes from the supply station and the magazine to the inserting station,
means in the inserting station for filling the inserts into the envelopes,
means for transporting filled envelopes from the inserting station,
and a filled envelope stacker station including:
   a receptacle,
   rollers operative to engage and drive the filled envelopes into the receptacle,
   and rockably mounted thrusting finger means operative to receive and thrust each successive filled envelope delivered into the receptacle into a stack in the receptacle.

16. In an inserting machine of the character described,
an insert supply station,
an envelope magazine,
an inserting station,
means for delivering respective inserts and envelopes from the supply station and the magazine to the inserting station,
means in the inserting station for filling the inserts into the envelopes,
means for transporting filled envelopes from the inserting station,
and a stacker station in which the filled envelopes are adapted to be stacked on edge including:
   a roller assembly including a driven roller and roller means cooperative therewith and movable away from said driven roller to receive a filled envelope between the driven roller and roller means and then operative to engage against the filled envelope to drive the filled envelope in a path transverse to the direction in which the envelope was received between the driven roller and the roller means,
   a receptacle to receive the filled envelopes as driven by said driven roller and roller means,
   and means between said roller and roller means and said receptacle and operative to guide the envelope in a generally flap edge upward direction into the receptacle and depositing of the envelope with its opposite edge down in the receptacle.

17. In an inserting machine of the character described,
an insert supply station,
an envelope magazine,
an inserting station,
means for delivering respective inserts and envelopes from the supply station and the magazine to the inserting station,
means in the inserting station for filling the inserts into the envelopes,
means for transporting filled envelopes from the inserting station,
and a stacker station in which the filled envelopes are adapted to be stacked on edge including:
   a roller assembly including a driven roller and roller means cooperative therewith and movable away from said driven roller to receive a filled envelope between the driven roller and roller means and then operative to engage against the filled envelope to drive the filled envelope in a path transverse to the direction in which the envelope was received between the driven roller and the roller means,
   rollers operating after said roller assembly to engage with the filled envelope as delivered thereto by said driven roller and said roller means and moving the envelope generally flap edge upwardly so that the opposite edge of the envelope is deposited downwardly,
   and a receptacle receptive of the filled envelopes on edge after leaving said rollers.

18. In an inserting machine of the character described,
an insert supply station,
an envelope magazine,
an inserting station,
means for delivering respective inserts and envelopes from the supply station and the magazine to the inserting station,
means in the inserting station for filling the inserts into the envelopes,
means for transporting filled envelopes from the inserting station,
and a stacker station in which the filled envelopes are adapted to be stacked on edge including:
   a roller assembly including a driven roller and roller means cooperative therewith and movable away from said driven roller to receive a filled envelope between the driven roller and roller means and then operative to engage against the filled envelope to drive the filled envelope in a path transverse to the direction in which the envelope was received between the driven roller and the roller means,
   driven rollers positioned to direct the filled envelope in a generally upward direction,
   a deflector engageable by the upwardly driven filled envelope leaving said driven rollers and assuring deposit of the envelopes in on-edge downward direction,
   and a receptacle receiving the filled envelopes on edge from the deflector.

19. In an inserting machine as defined in claim 32, having thrust means operative to engage each successive filled envelope received in the receptacle to push such filled envelope away from said driven rollers and said deflector.

20. In an inserting machine including an insert station and an envelope magazine and an inserting station in which inserts and envelopes with flaps are delivered from the inserting station and the envelope magazine are assembled together by filling of an insert into an envelope with its flap open,
  means for maintaining the envelope flap open during inserting,
  a stacker station receptive of the filled envelope,
  and means for delivering the filled envelope with its flap still open into said stacker station, said stacker station including:
    an envelope receptacle,
    a first set of rollers engageable with the filled envelope to move it toward the receptacle open flap first,
    a second set of rollers spaced from the first set of rollers in the direction of movement of the envelope therefrom toward the receptacle,
    and a bar mounted between said first and second sets of rollers and across the path of movement of the envelope and operative to guide the envelope flap into closing position relative to the envelope as the filled envelope is moved by the first set of rollers toward the second set of rollers.

21. In an inserting machine including an insert station and an envelope magazine and an inserting station in which inserts and envelopes with flaps are delivered from the inserting station and the envelope magazine are assembled together by filling of an insert into an envelope with its flap open,
  means for maintaining the envelope flap open during inserting,
  a stacker station receptive of the filled envelope,
  and means for delivering the filled envelope with its flaps still open into said stacker position, said stacker station including:
    an envelope receptacle,
    a first set of rollers engageable with the filled envelope to move it toward the receptacle open flap first,
    a second set of rollers spaced from the first set of rollers in the direction of movement of the envelope therefrom toward the receptacle,
    and an envelope flap controlling bar interposed across the path of movement of said envelope between said first and second sets of rollers and comprising means adjustable for selectively moving the envelope flaps into closing position while being moved by the first set of rollers toward the second set of rollers or for maintaining the flaps open so as to pass in open condition through the second set of rollers.

22. In an inserting machine including an insert supply station, an envelope magazine, an inserting station, and a filled envelope stacking station,
  means for handling and motivating inserts and envelopes from the insert supply station and the envelope magazine through said inserting station and in the stacker station,
  driving transmission mechanism connecting the motor with said means and including an electromagnetic clutch,
  electrical circuitry for controlling said clutch, a manually operable crank for driving said transmission mechanism alternatively to said motor,
  and electrical control switch means in said electrical circuit operative by manipulation of said crank to operate said clutch to disconnect the motor from said transmission mechanism.

23. In an inserting machine of the character described,
  means operative to supply inserts and envelopes from respective stacks,
  means operative to assemble respective inserts in respective envelopes,
  and a pneumatic system including:
    a plurality of devices operative on said inserts and envelopes at various intervals in a cycle of operation of the machine,
    a vacuum pump,
    at least one valve assembly including a stationary body having a valve face,
    means communicating said face with the pump through said valve body,
    means communicating one of said devices with said face through the valve body,
    a rotary shaft extending through the valve body and said face,
    a valve timing disk axially movably mounted on said shaft and lapping said face to control communication between said communication means in the rotation of the disk,
    a crank arm fixedly carried by the shaft and engaging the disk to drive the disk corotatively with the shaft but permitting free axial movement of the disk on the shaft,
    and biasing means thrusting the disk continuously against said face.

24. In an inserting machine of the character described,
  means for supplying and assembling respective inserts and envelopes,
  means for handling the inserts and envelopes including at least two pneumatic sucker assemblies,
  and means for operating said sucker assemblies in timed relation including:
    a vacuum pump,
    a stationary valve body having oppositely facing valve faces,
    means communicating said vacuum pump through said body with said faces,
    means communicating said valve faces through said valve body respectively with said devices,
    respective controlling valve plate disks lappingly engaging said faces,
    means biasing said disks against the respective faces,
    and means rotatably driving said disks relative to said faces.

25. In an inserting machine of the character described,
  an insert supply station including means for feeding inserts therefrom including a malfunction detector comprising a switch adapted to be opened from a closed condition incident to a malfunction,
  an envelope magazine including means for feeding envelopes therefrom and for opening the envelope flaps and including a malfunction detector comprising a switch adapted to be opened incident to a malfunction,
  an inserting station,
  means for feeding inserts and envelopes into the inserting station,
  means in the inserting station for assembling the inserts and envelops and a malfunction detector including a switch adapted to be opened incident to a malfunction,
  a filled envelope stacker assembly and means for delivering filled envelopes from the inserting station to the stacker assembly,
  means for driving all moving structures of the machine,
  an electrical motor,
  means operatively connecting the motor with the driving means and including an electromagnetic clutch,
  and an electrical control circuit comprising:
    an electrical power connection with an alternating current source directly connected to said motor and having a master switch therein, a full wave rectifier directly connected to said electrical connection and having a direct current connection with said clutch, a relay having normally open contacts in said direct current connection, a circuit electrically connecting said relay with the power connection and having all of said malfunction detector switches connected therein in series whereby to deenergize the relay upon opening of any of said detector switches, a normally open starting switch in said relay circuit, a shunt around said starting switch, a normally closed stop switch and normally open relay holding contacts of the relay in said shunt, whereby closing of the master switch energizes the motor to run continuously and closing of the starting switch energizes the relay to close said direct current connection contacts and said holding contacts, and opening of any of said malfunction detector switches or said stop switch deenergizes the relay to stop the machine.

26. In an inserting machine of the character described, means defining an insert station including a frame supporting an insert magazine, a receiving table below and forwardly from said magazine, said frame having a forward extension therefrom overlying said table in spaced relation and in front of said insert magazine, an envelope hopper structure carried by said frame extension above said receiving table spaced forwardly from and in alignment with said insert magazine, said hopper structure comprising a bar rigidly supported at least in part by said frame extension and providing an envelope edge support ledge, upstanding envelope magazine plate means adjustably mounted longitudinally along said bar, adjustment rod means carried at least in part by said frame extension and extending along said bar and having operative connection with said plate means to adjust the same for accommodating different sizes of envelopes, means for removing respective inserts from said insert magazine and means for pulling envelopes downwardly from said hopper structure and depositing the inserts and the envelopes on the table, and means operative to transport the respective inserts and envelopes deposited on the table into a front-to-rear aligned relation laterally adjacent to said magazines for assembly of the inserts with the respective envelopes.

27. In an insert machine of the character described having electrical means for controlling operation thereof, means providing an insert supply station, means providing an envelope supply magazine aligned with said insert station, an inserting station alongside said insert supply station and envelope magazine, means for feeding successive inserts and envelopes to said inserting station, means for aligning the inserts and envelopes in the inserting station, means for opening the envelopes, means for inserting the aligned insert into the opened envelope, and detector means sensitive to jamming of an insert during the inserting operation to signal said electrical means to stop the machine, and comprising:

a rod extending longitudinally substantially parallel to the path of movement of the envelopes, means journalling said rod for oscillatory movement, a downwardly and forwardly extending detector trip foot overlying the mouth portion of the envelope, a trip arm projecting from the rod and oscillatable therewith, and a switch comprising part of said electrical means and mounted to be operated by said trip arm in the event of jamming of an insert during the inserting operation.

28. A machine of the character described, having: means defining a path of movement of a relatively flat article, continuously running transporting means engaging the underside of the article to advance it along said path, and means located intermediate the length of the path for selectively stopping the article in its advance and then continuing the advance of the article and including:

an assembly having a stop and press-down roller means, means for raising and lowering said assembly relative to said transporting means, and means in said assembly acting when the assembly is raised to move said stop into stopping position in the path of the article to stop the article, and acting in response to lowering of the assembly to move the stop out of said stopping position and to thrust said roller means toward said transporting means and against the article to resume advance of the article along said path.

29. A machine as defined in claim 28, in which said assembly includes a head member, a rocker arm mounting said head member, a supporting arm extending from said head member longitudinally of said path and carrying said stop and said roller means, and means for adjusting said supporting arm relative to said head member and longitudinally of said path.

30. An inserting machine of the character described, comprising:

an insert supply station and means for transporting successive inserts therefrom, an insert station to which the successive inserts are transported, an envelope magazine generally aligned with said insert supply station, a continuously running transport belt extending from said envelope magazine past said inserting station, means for feeding successive envelopes from said envelope magazine onto said belt, roller means cooperating with said belt to effect transport of the successive envelopes into alignment with said inserting station, releasable stop means operative to stop each envlope in alignment with said inserting station, means for inserting the insert in the inserting station into the stopped and aligned envelope, roller means mounted above said belt in general alignment with said inserting station and operable alternatively to said stop to be moved clear of the belt when the stop is in envelope stopping position and being movable into envelope engaging and pressing relation toward said belt when the stop is released from the envelope holding position to cause transporting of the filled envelope onwardly beyond the inserting station, a stacker station beyond the effective end of said belt beyond said inserting station, and additional roller means cooperating with said belt to effect movement and delivery of the filled envelope to the stacker station after the filled envelope has been released from said stop and has been moved onward by said alternatively operable roller means.

(References on following page)

References Cited

UNITED STATES PATENTS

| | | | |
|---|---|---|---|
| 1,122,519 | 12/1914 | Lovercheck | 53—188 |
| 1,172,824 | 2/1916 | Newman | 53—266 X |
| 1,960,959 | 5/1934 | Sague | 53—188 X |
| 2,058,005 | 10/1936 | Donnellan | 53—57 |
| 2,325,455 | 7/1943 | Williams | 53—57 |
| 2,358,742 | 9/1944 | Sickles | 271—32 |
| 2,392,746 | 1/1946 | Labombarde | 271—69 X |
| 2,736,999 | 3/1956 | Rouan et al. | 53—29 |
| 2,746,221 | 5/1956 | Rouan et al. | 53—266 X |
| 2,815,207 | 12/1957 | Skow | 271—29 |
| 2,997,833 | 8/1961 | Nigrelli et al. | 53—382 |
| 3,174,259 | 3/1965 | Jones et al. | 53—48 |

TRAVIS S. McGEHEE, *Primary Examiner.*

FRANK E. BAILEY, WILLIAM W. DYER, *Examiners.*

N. ABRAMS, *Assistant Examiner.*